US011435528B1

(12) United States Patent
Gao et al.

(10) Patent No.: US 11,435,528 B1
(45) Date of Patent: Sep. 6, 2022

(54) PHOTONIC INTEGRATED CIRCUITS WITH INTEGRATED OPTICAL CONDITIONING ELEMENTS

(71) Applicant: Meta Platforms Technologies, LLC, Menlo Park, CA (US)

(72) Inventors: Zihe Gao, Redmond, WA (US);
Zhaoming Zhu, Redmond, WA (US);
Michael Hall, Bellevue, WA (US);
Guohua Wei, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 61 days.

(21) Appl. No.: 16/924,676

(22) Filed: Jul. 9, 2020

Related U.S. Application Data

(60) Provisional application No. 63/011,662, filed on Apr. 17, 2020, provisional application No. 62/951,922,
(Continued)

(51) Int. Cl.
*G02B 6/34* (2006.01)
*G01B 11/22* (2006.01)
(Continued)

(52) U.S. Cl.
CPC ............... *G02B 6/34* (2013.01); *G01B 11/22* (2013.01); *G02B 6/42* (2013.01); *G02B 27/0172* (2013.01);
(Continued)

(58) Field of Classification Search
CPC .......... G02B 6/34; G02B 6/42; G02B 6/4214; G02B 27/0172; G02B 27/0944;
(Continued)

(56) References Cited

U.S. PATENT DOCUMENTS

| 2014/0270642 A1* | 9/2014 | Frish | ...................... G02B 6/122 |
| | | | 385/37 |
| 2015/0063745 A1* | 3/2015 | Lin | ......................... H01S 5/026 |
| | | | 385/14 |

OTHER PUBLICATIONS

Bovington, J. T. et al. "Heterogeneous Lasers and Coupling to $Si_3N_4$ near 1060 nm." Optics Letters, vol. 39, Iss. 20, Oct. 15, 2014, pp. 6017-6020.
(Continued)

*Primary Examiner* — Michael P Mooney
(74) *Attorney, Agent, or Firm* — Fenwick & West LLP

(57) ABSTRACT

A photonic integrated circuit assembly generates light for use in a display system or a depth sensing system. The photonic integrated circuit assembly includes optical conditioning elements integrated into a photonic integrated circuit. The photonic integrated circuit includes one or more light sources on the photonic integrated circuit. The photonic integrated circuit includes a waveguide and one or more gratings located in a core of the photonic integrated circuit. The gratings may collimate and/or collocate light emitted by the light source. The photonic integrated circuit may include a beam shaping element integrated into the photonic integrated circuit. A MEMS scanner may use the collocated and/or collimated light emitted by the photonic integrated circuit to generate a display for a user or to generate a structured light pattern for use in a depth sensing system.

9 Claims, 19 Drawing Sheets

Related U.S. Application Data filed on Dec. 20, 2019, provisional application No. 62/931,451, filed on Nov. 6, 2019.

(51) Int. Cl.
  *G02B 27/01*  (2006.01)
  *G02B 27/09*  (2006.01)
  *G02B 6/42*  (2006.01)
(52) U.S. Cl.
  CPC .. *G02B 27/0944* (2013.01); *G02B 2027/0112* (2013.01)
(58) Field of Classification Search
  CPC .. G02B 2027/0112; G02B 6/02; G02B 6/124; G02B 6/43; G01B 11/22
  USPC .................................................. 385/14, 901
  See application file for complete search history.

(56) References Cited

OTHER PUBLICATIONS

Molesky, S. et al. "Inverse Design in Nanophotonics." Nature Photonics, vol. 12, Nov. 2018, pp. 659-670.
Zhou, W. et al. "Dual-Wavelength-Band Subwavelength Grating Coupler Operating in the Near Infrared and Extended Shortwave Infrared." Optics Letter, vol. 44, Iss. 15, Aug. 1, 2019, pp. 3621-3624.

* cited by examiner

US 11,435,528 B1

PHOTONIC INTEGRATED CIRCUITS WITH INTEGRATED OPTICAL CONDITIONING ELEMENTS

CROSS REFERENCE TO RELATED APPLICATIONS

This application claims the benefit of U.S. Provisional Application No. 63/011,662, filed Apr. 17, 2020, U.S. Provisional Application No. 62/951,922, filed Dec. 20, 2019, and U.S. Provisional Application No. 62/931,451, filed Nov. 6, 2019, which are incorporated by reference in their entirety.

FIELD OF THE INVENTION

This disclosure relates generally to artificial reality systems, and more specifically to photonic integrated circuits for artificial reality systems.

BACKGROUND

Scanning display systems and structured light illuminators typically include an optical source, refractive or diffractive collimators, refractive beam combiners, pattern generators, and/or microelectromechanical systems (MEMS) scanning mirrors. The components are typically separate components assembled together as a discrete component system. The discrete component systems are large in size and may be relatively expensive to assemble. Additionally, the refractive collimators often involve multi-element refractive optics which add to the size and cost of the scanning display systems.

SUMMARY

A photonic integrated circuit (PIC) assembly generates light. The photonic integrated circuit assembly may be used in, e.g., a display system and/or a depth sensing system. The photonic integrated circuit assembly includes optical conditioning elements integrated into a photonic integrated circuit. The photonic integrated circuit assembly may be contained in a smaller package than systems which comprise discrete optical conditioning elements coupled together. Additionally, the integrated optical conditioning components may decrease difficulties in aligning discrete components of typical systems. The photonic integrated circuit includes a light source on the photonic integrated circuit. The photonic integrated circuit includes a waveguide and one or more gratings located in a core of the photonic integrated circuit. The gratings may condition the light. Conditioning the light may include collimating, collocating, redirecting, shaping, or some combination thereof, light emitted by the light source. The photonic integrated circuit may include a beam shaping element integrated into the photonic integrated circuit. A MEMS scanner may use the collocated and/or collimated light emitted by the photonic integrated circuit to generate a display for a user or to generate a structured light pattern for use in a depth sensing system.

In some embodiments, a PIC comprises a substrate. The PIC comprises a light source coupled to the substrate. The light source is configured to emit light. The PIC comprises an incoupling section that is configured to incouple the light from the light source into a core coupled to the substrate. The PIC comprises a waveguide section that is configured to direct the incoupled light within the core along a first direction (e.g., parallel to a surface of the substrate). The PIC comprises an optical conditioning section that includes one or more gratings that are part of the core and are configured to condition the incoupled light and output the conditioned light in a second direction different than the first direction (e.g., perpendicular to the surface of the substrate).

In some embodiments, a PIC comprises an incoupling section that is configured to incouple light in a first color channel (e.g., red, green, blue, etc.) from a light source into a first core. The PIC comprises a waveguide section that is configured to direct the incoupled light within the core along a first direction. The PIC comprises an optical conditioning section that includes one or more gratings that are part of the core and are configured to condition the incoupled light from the light source and output the conditioned light in a second direction different than the first direction.

In some embodiments, a PIC comprises a substrate. The PIC comprises an infrared light source coupled to the substrate. The infrared light source is configured to emit infrared light. The PIC comprises an incoupling section that is configured to incouple the light from the infrared light source into a core that is coupled to the substrate. The PIC comprises a waveguide section that includes a waveguide that is configured to direct the incoupled light within the core along a first direction. The PIC comprises an optical conditioning section that includes one or more gratings that are part of the core and are configured to condition the incoupled light from the waveguide and output the conditioned light in a second direction different than the first direction.

Figure 1A:
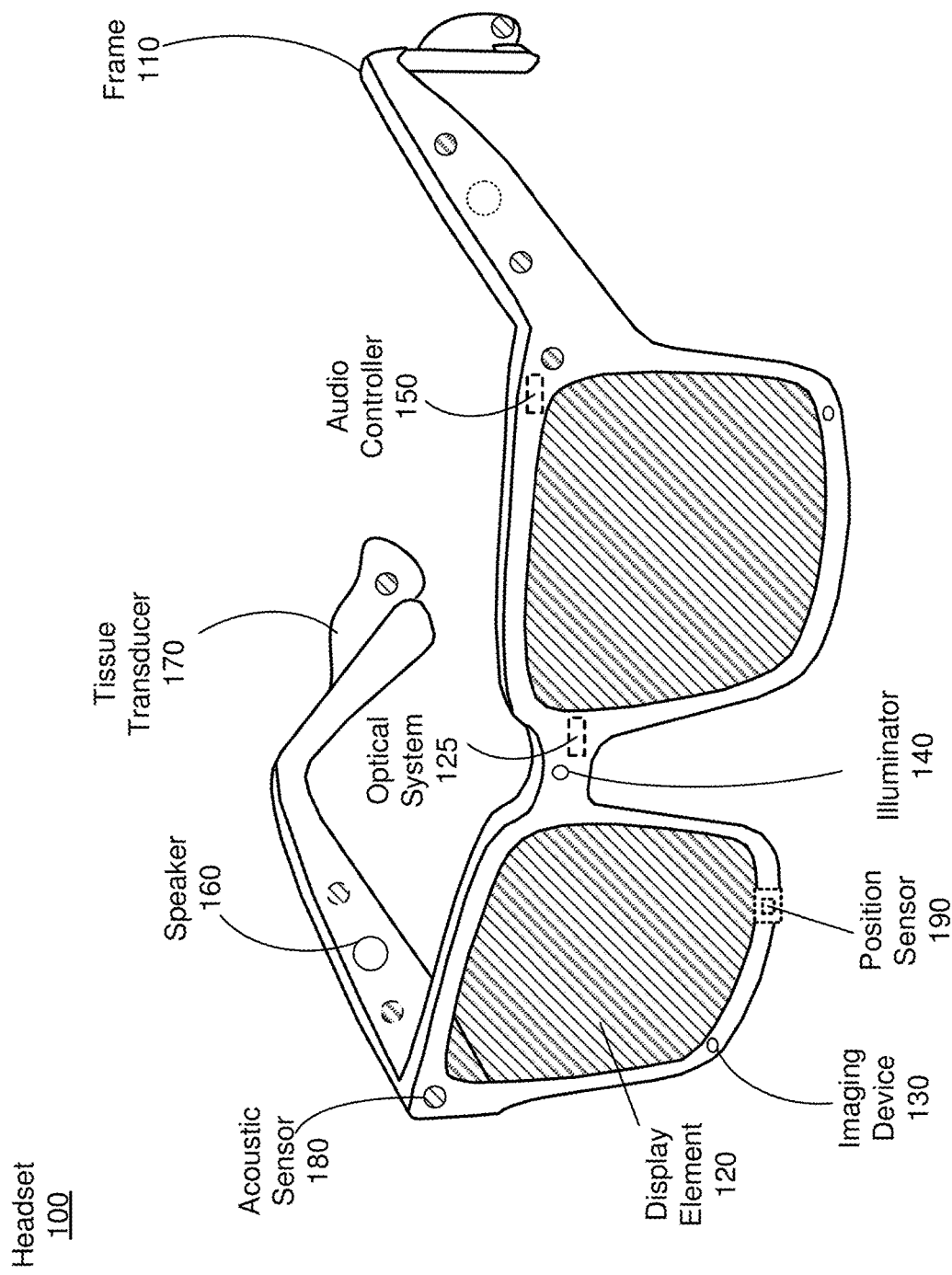
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Photonic integrated circuits with integrated optical conditioning elements are disclosed herein that reduce the size, packaging cost, and alignment of typical systems with discrete components that are subsequently coupled together. A PIC assembly generates light for use in a display system or a depth sensing system. The PIC assembly includes optical conditioning elements integrated into a PIC. The PIC assembly may be contained in a smaller package than systems which comprise discrete optical conditioning elements coupled together. Additionally, the integrated optical conditioning components may decrease difficulties in aligning discrete components of typical systems. The PIC includes a light source on the PIC. For display systems, the light source may include multiple light sources having different color channels (i.e., different wavelengths), such as red-green-blue (RGB) light sources. For depth sensing systems, the light source may include a single infrared light source. The PIC includes a waveguide and one or more gratings that are part of a core of the PIC. The gratings may condition (e.g., collimate, collocate, redirect, and/or shape) light emitted by the light source. The PIC may include a beam shaping element integrated into the PIC (e.g., to form a structured light pattern). A scanning assembly may use the collocated and/or collimated light emitted by the PIC to generate a display for a user. The PIC may generate a structured light pattern for use in a depth sensing or eye tracking system. A scanning assembly may condition the structured light pattern. For example, the scanning assembly may tile the structured light pattern, increase a projection area of the structured light pattern, project the structured light pattern over specific portions of a local area, or some combination thereof.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

The display assembly may comprise an optical system 125 comprising one or more PICs. The optical system 125 is shown in the bridge of the frame 110. However, in other embodiments the optical system 125 may be located closer to the display elements, illuminator 140, or at any other suitable location, which may vary based on the configuration of the optical system 125 (e.g., for use with a display, a depth sensing system, or with an eye tracking system). The PICs include one or more light sources and one or more optical conditioning elements integrated in a small form factor. The PICs provide conditioned light to the display elements 120. For example, the PICs may collimate, collocate, and/or redirect light as further described with reference to FIGS. 2-11, 15, and 17.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA may comprise the optical system 125. For example, in some embodiments the illuminator 140 may comprise one or more PICs. The PICs include an IR light source and one or more optical conditioning elements integrated in a small form factor. The PICs provide conditioned light to the illuminator 140, as further described with reference to FIGS. 2-3B, 12-14, and 16-17.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). In some embodiments, one or more of the illuminators are PICs that generate the light for the illumination pattern. The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 17.

Figure 1B:
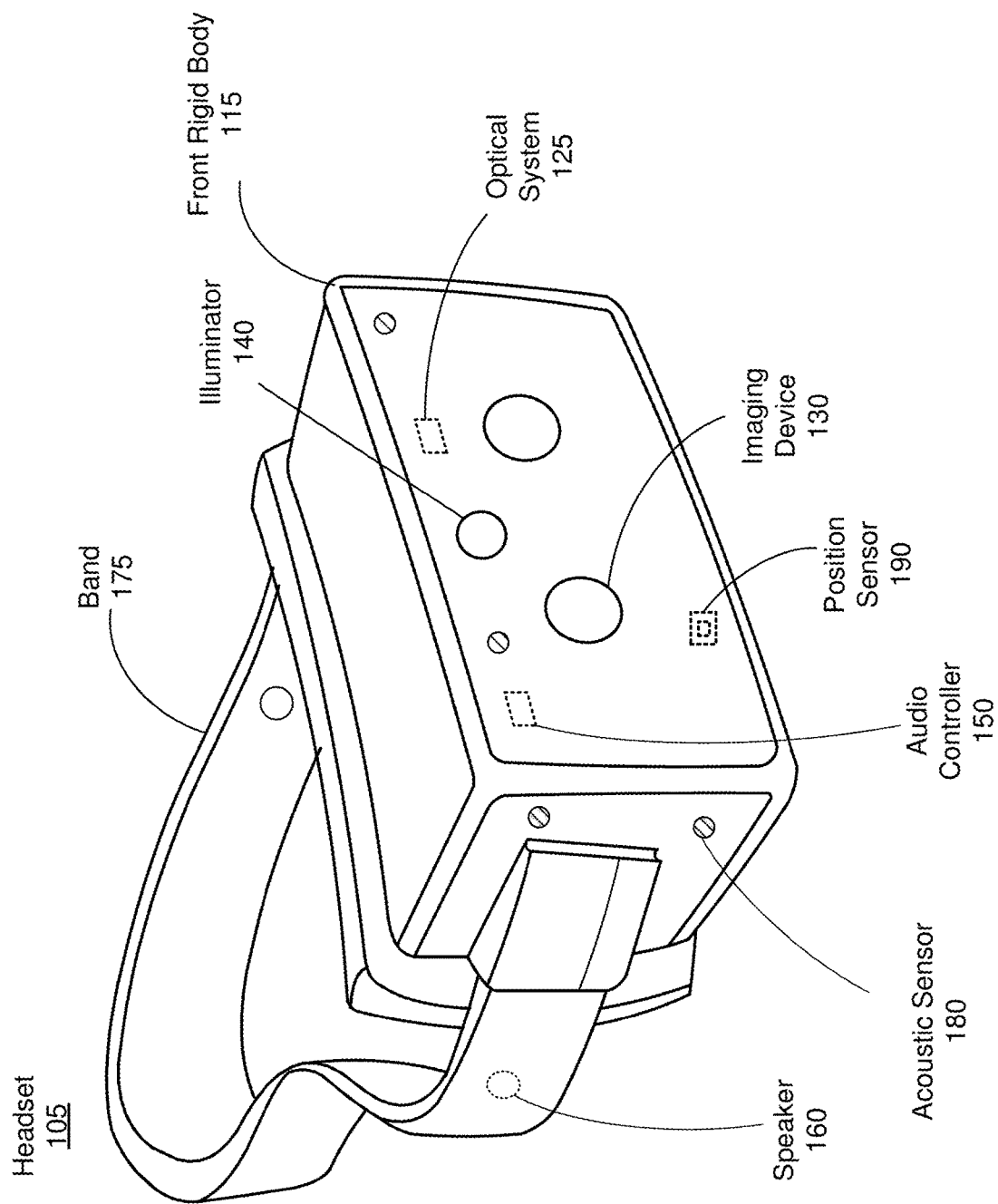
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~340 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the optical system 125, the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
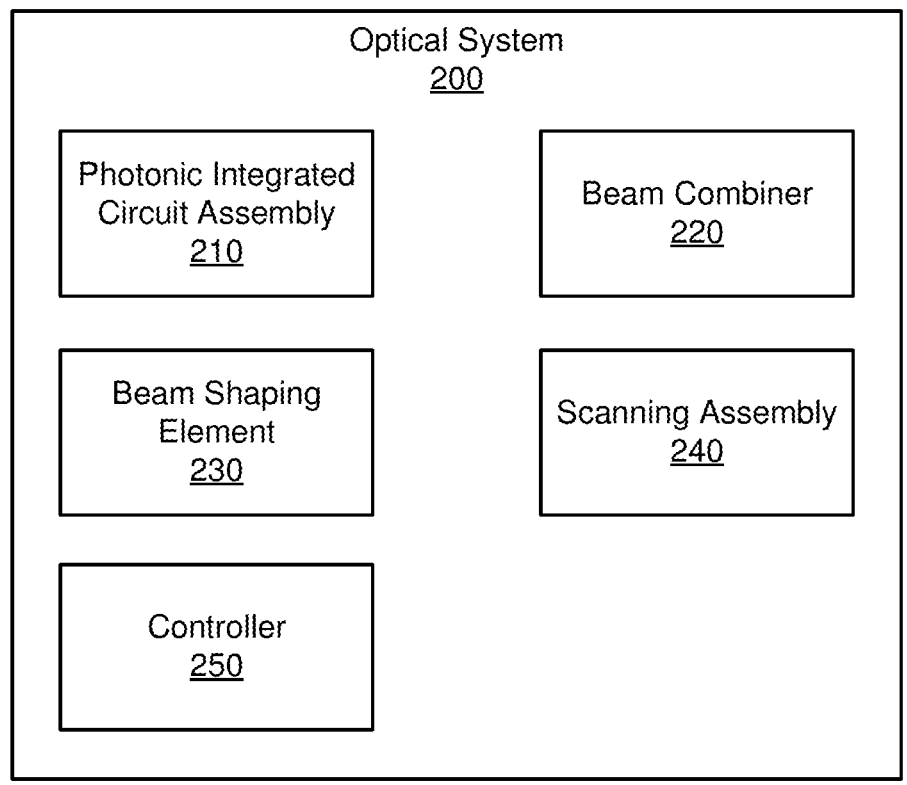
FIG. 2 is a block diagram of an optical system, in accordance with one or more embodiments.

FIG. 2 is a block diagram of an optical system 200, in accordance with one or more embodiments. The optical system 200 is configured to provide conditioned light for a headset, such as the headset 100 of FIG. 1. The conditioned light may be utilized in a display system or as structured light for a depth sensing system. The optical system 200 includes a PIC assembly 210. In some embodiments, the optical system 200 may also include a beam combiner 220, a beam shaping element 230, a scanning assembly 240, a controller 250, or some combination thereof.

The PIC assembly 210 is configured to generate conditioned light. The PIC assembly comprises one or more PICs, and may also comprise additional elements external to the PICs to further condition the light emitted from the PICs. Each PIC comprises multiple elements combined on a single substrate. The elements including at least one light source, at least one incoupling section, at least one waveguide section, and at least one optical conditioning section. The PIC comprises multiple layers that may be grown, deposited, or bonded on top of a substrate. The substrate may comprise silicon, gallium arsenide (GaAs), indium phosphide (InP), gallium nitride (GaN), quartz ($SiO_2$), sapphire ($Al_2O_3$), or glass. The PIC comprises one or more cores coupled to the substrate. A core may comprise a layer of silicon nitride (SiN) or silicon. The PIC may comprise one or more cladding layers deposited on either side of the core. The cladding layers may comprise silicon oxide ($SiO_2$). The material of the core may comprise a high index relative to the cladding layers. The PIC may comprise alternating high index cores and low index cladding layers. In some embodiments, multiple cladding layers in the same PIC may comprise different materials. For example, a first cladding layer may be composed of a different material than a second cladding layer. In some embodiments, multiple cores in the same PIC may comprise different materials. For example, a first core may be composed of a different material than a second core.

The PIC comprises an incoupling section configured to incouple light from a light source to the one or more cores. The PIC comprises a light source in the incoupling section configured to generate light. The light source may comprise an active material, such as a III-V epitaxy. In some embodiments, the III-V active material may include gallium arsenide phosphide (GaAsP) for red light emitting diode (LED), indium gallium nitride (InGaN) for blue and green LED. Each III-V active material may include multiple layers of epitaxy, such as quantum wells, separate confinement heterostructures, p-contact layer, n-contact layer, etc. The light source may comprise LEDs, superluminescent LEDs, vertical cavity surface emitting lasers (VCSELs), microLEDs, etc. The light source generates photons upon external excitation, such as electrical injection of current or optical pumping. In some embodiments, the light source may comprise multiple light sources having different wavelengths, such as a red light source, a green light source, and a blue light source. Light sources of different wavelengths may be used to generate a color display, such as an RGB display. In some embodiments, the light source may be an infrared light source. An infrared light source may output near infrared or short-wave infrared wavelengths, which may be used to generate a structured light pattern (e.g., for a depth sensing system and/or eye tracking system).

The incoupling section comprises an incoupling structure configured to incouple light from the light source to one or more wave guides. The incoupling structure may comprise a single-layer grating, a dual-layer grating, a grating with a back reflector (e.g., a distributed Bragg reflector, a metal reflector mirror, etc.) underneath the grating that is optimized for incoupling efficiency, a grating with apodization for period and duty cycle, a grating-like structure that is inversed designed for optimized incoupling for that light source, or some combination thereof.

Figure 13:
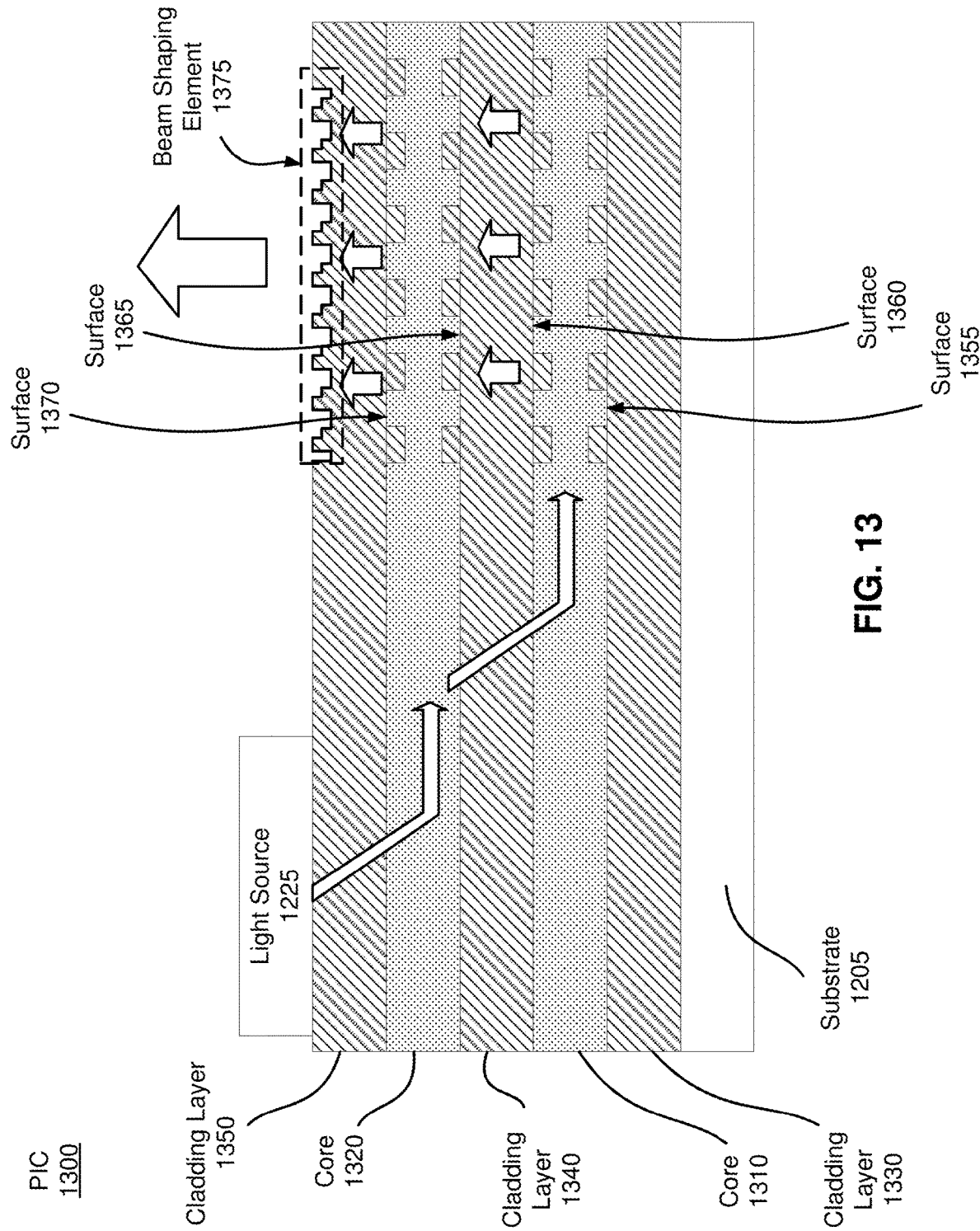
FIG. 13 illustrates a cross-section of a PIC with multiple cores configured as a structured light illuminator, in accordance with one or more embodiments.

The PIC may comprise a waveguide section configured to transmit the photons incoupled by the incoupling section to an optical conditioning section. The waveguide section may comprise a waveguide that is part of the core of the PIC. The waveguide may comprise SiN, silicon, glass, plastic, or any other suitable material capable of transmitting light in a first direction with minimal energy loss. In some embodiments, the photons may be collected from the light source into the waveguide section through adiabatic mode conversion. The optical mode in the light source section may be hybrid mode(s) residing in both the III-V layers and the SiN core, while the optical mode in the waveguide section may be entirely in the waveguides. Between the light source and the waveguide section, there may be a transition section that adiabatically converts the hybrid mode(s) into waveguide modes, which may involve taper structures, such as a 2-stage taper structure. The PIC is configured to match the incident light from the light source to the guided mode of the waveguide. The transition region may be tailored such that the incident light is mode matched to the target waveguide. In embodiments comprising multiple waveguides (e.g., as shown in FIG. 13), the incident light can be first maximally coupled to a top waveguide, and a portion of the guided light in the top waveguide can be subsequently coupled into a bottom waveguide using directional coupling approaches. The waveguide section may comprise a fan-out waveguide (e.g., as described below with regard to FIG. 11) configured to incouple light to the optical conditioning section.

The optical conditioning section is configured to condition the light received from the waveguide section. Conditioning the light may include redirecting the light, collimating the light, combining light beams, shaping the beams, aiming the beams, or some combination thereof. The optical conditioning section may be configured to receive the light from the waveguide section through the core, and transmit the light in second direction out a top surface of the PIC. For example, the conditioning section may redirect the light from a direction parallel to a surface of the substrate to a direction orthogonal to the substrate (e.g., perpendicular to the surface of the substrate).

In some embodiments with multiple light sources having different wavelengths, the PIC may comprise a multiple-wavelength grating, such as a triple-wavelength grating configured to condition light from light sources of different wavelengths. The multiple-wavelength grating is configured to condition (e.g., collimate and collocate) the light from the light sources of different wavelengths. The multiple-wavelength grating may transmit collimated and collocated beams from the PIC without separate beam combining optics. The multiple-wavelength grating may comprise a metasurface or a grating coupler. The light from the different light sources may be injected from different ports of the multiple-wavelength grating or from a single port of the multiple-wavelength grating. The multiple-wavelength grating may comprise a tri-periodic structure, in which the period for each wavelength is combined, such that the multiple-wavelength grating may condition light for three different wavelengths. The multiple-wavelength grating is further described with respect to FIG. 10.

The optical conditioning section may be configured to condition (e.g., collimate, collocate, redirect, shape, or some combination thereof) the light received from the waveguide section. The optical conditioning section may comprise one or more gratings. The gratings may be located at one or both sides of one or more cores, at an air-cladding interface, or some combination thereof. In some embodiments with multiple light sources having different wavelengths, the PIC may comprise one grating for each light source, and each grating may be optimized for a single wavelength or a narrow wavelength band. For example, the PIC may comprise one grating optimized for a red light source, one grating optimized for a green light source, and one grating optimized for a blue light source. Each grating may have different parameters, such as grating pitch and duty cycle. In some embodiments, in order to achieve collocated beams, the gratings may be located close to each other, such that the conditioned light leaving the gratings is approximately collocated. The conditioned light is considered collocated if the resultant beams are configured to reach a user's retina within the optical visual resolution or the retina. The specific pitch distance between gratings for collocation may be dependent on downstream optics in the system. In some embodiments, a beam combiner may be used to combine the light leaving the gratings into a collocated beam. Beam combiners are further described herein with reference to FIG. 6 and FIG. 7.

The beam combiner 220 is configured to collocate multiple light beams. In some embodiments, the beam combiner 220 may be a subcomponent of the PIC 210. In other embodiments, the beam combiner 220 may be external to the PIC. The beam combiner 220 may comprise a refractive or diffractive beam combiner. The refractive beam combiner may utilize multiple mirrors or lenses to combine multiple beams into a single beam. The refractive beam combiner may receive multiple collimated but non-collocated beams from separate gratings and combine the beams into a single collimated and collocated beam. The diffractive beam combiner may utilize a flat optical component in the form of a diffractive grating or a metasurface. The diffractive beam combiner may receive different wavelength beams from different angles, such that the beams conditioned by the diffractive beam combiner are each diffracted by a different amount and all exit the diffractive beam combiner at the same angle, resulting in a collimated collocated beam.

The beam shaping element 230 is configured to shape a beam into a target structured light pattern and/or directionalize the beam. For example, the beam shaping element 230 may be configured to generate dots or grids for depth sensing, diffract the light into a desired direction, increase divergence of the beam, generate interference structures, or perform any other desired beam shaping. In some embodiments, the beam shaping element 230 may be a portion of the PIC 210, such as located at the air/PIC interface, at the interface between cladding and cores of the PIC 210, or some combination thereof. The structure of the beam shaping element 230 may comprise etched patterns in and/or on top of the PIC, micro metallic particles, metasurfaces including metallic nanostructures or dielectric nanostructures, films, or some combination thereof.

The scanning assembly 240 is configured to deflect the conditioned light beams to create an image or pattern. The scanning assembly 240 may comprise MEMS scanning mirrors, MEMS phase modulators, liquid crystal flat optics, some other scanning element, or some combination thereof. The MEMS scanning mirror may comprise a silicon device with a mirror at the center. The mirror may be connected to flexures that allow it to oscillate on one or more axes to project light. The MEMS scanning mirrors scan along rows of PICs to redirect the conditioned light emitted by the PICs. The optical system 200 may then direct image light from the scanning assembly 240 onto an entrance location of an output waveguide to direct the image light to a user.

The optical system 200 comprises a controller 250 configured to provide instructions to the various components of the optical system 200. In order to generate an image or pattern, the controller 250 provides instructions to the PIC assembly 210 to activate, deactivate, or modulate the intensity of the light sources on the various PICs. In some embodiments, the controller 250 provides instructions to the scanning assembly 240 to generate a target image and/or pattern using the light generated by the PIC assembly 210 and conditioned by the beam combiner 220 and/or beam shaping element 230 if present.

Figure 3A:
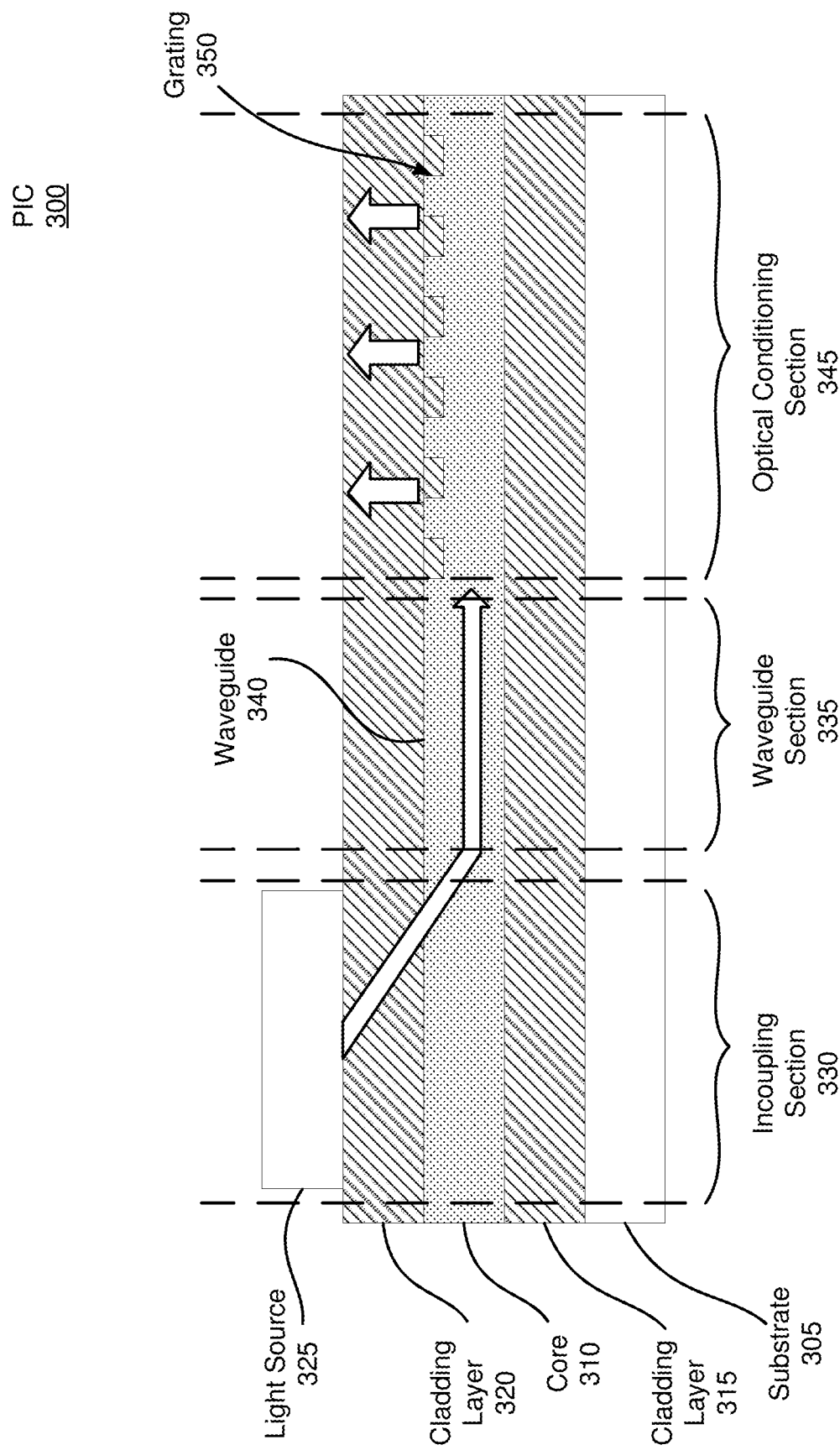
FIG. 3A illustrates a cross-section view of a PIC, in accordance with one or more embodiments.

FIG. 3A illustrates a cross-section view of a PIC 300 in accordance with one or more embodiments. The PIC 300 is configured to generate conditioned light for use in a display or depth sensing system. The PIC 300 may be an embodiment of the PIC assembly 210 of FIG. 2. The PIC 300 may comprise a substrate 305, a core 310, a cladding layer 315, a cladding layer 320, and a light source 325.

The substrate 305 is configured to provide a surface on which the other components are deposited. The substrate may comprise silicon, GaAs, InP, GaN, $SiO_2$, $Al_2O_3$, or glass. The various components of the PIC 300 may be grown, deposited, or bonded on top of the substrate 305. The PIC 300 comprises an incoupling section 330 configured to incouple light from the light source 325. The PIC 300 comprises a waveguide section 335 containing a waveguide 340 configured to transmit the incoupled light to an optical conditioning section 345. The waveguide section 335 may comprise a fan-out waveguide configured to incouple light to the optical conditioning section 345. The optical conditioning section 345 comprises one or more gratings configured to condition the light. As illustrated the cored 310 includes a grating 350 that interfaces with the cladding layer 320. In other embodiments (not shown), a grating could also or alternatively be on an opposite surface of the core 310 such that it interfaces with the cladding layer 315. Dual-layer gratings may be utilized for both display and depth sensing applications, as dual-layer gratings may improve the outcoupling efficiency to the upper emission of light. Dual-layer gratings are further described with respect to FIG. 12. Conditioning the light may include redirecting the light, collimating the light, combining light beams, shaping the beams, aiming the beams, or some combination thereof.

The core 310 is configured to receive light from the light source 325, direct the light through the core, and condition the light. The core 310 may comprise a high-index material, such as SiN. In embodiments without cladding layers, the core 310 may be deposited directly on the substrate 305. The core 310 may comprise one or more of the gratings 350.

The PIC 300 may comprise a cladding layer 315 and a cladding layer 320 configured to provide protective material around the core 310 and to provide additional surfaces on which to create optical conditioning elements. The cladding layer 315 may be deposited directly on the substrate 305 and be located between the substrate 305 and the core 310. The cladding layer 320 may be deposited on the core 310 and be exposed to the air on the top surface of the PIC 300. The cladding layer 315 and the cladding layer 320 may comprise a low index material relative to the core 310. In some embodiments, the low index material may comprise, for example $SiO_2$.

The PIC 300 comprises at least one light source 325 configured to generate light. For embodiments where the PIC 300 is configured to provide conditioned light for a display, the PIC 300 may comprise light sources of multiple wavelengths, such as a red light source, a green light source, and a blue light source. For embodiments, where the PIC 300 is configured to provide structured light for a depth sensing system, the PIC 300 may comprise a single light source, such as a near infrared (NIR) light source, or a short-wave infrared (SWIR) light source. The light source 325 may be deposited or grown on the top surface of the cladding layer 320. In embodiments without cladding layers, the light source 325 may be deposited or grown directly on the core 310.

Figure 3B:
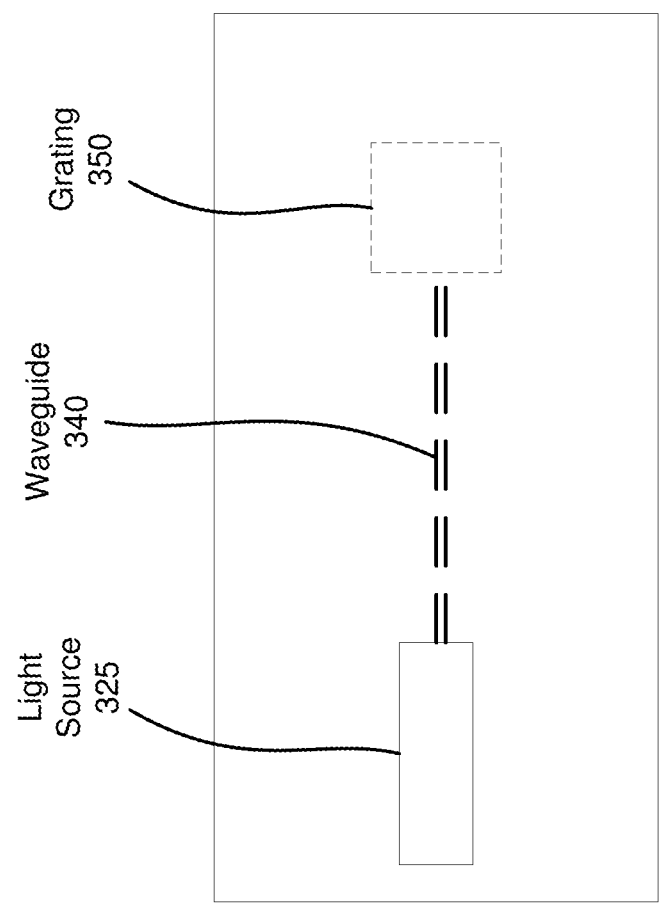
FIG. 3B illustrates a top view of the PIC shown in FIG. 3A, in accordance with one or more embodiments.

FIG. 3B illustrates a top view of the PIC 300 shown in FIG. 3A, in accordance with one or more embodiments. As illustrated, the PIC 300 comprises the single light source 325, the waveguide 340, and the single grating 350. However, in other embodiments, the PIC 300 may comprise multiple light sources 325, waveguides 340, and gratings 350. In embodiments comprising cladding layers, the waveguide 340 and the grating 350 may be located below the top cladding layer, and thus would not be visible from the top view shown in 3B. For example, in the illustrated example, the top cladding layer would correspond to the cladding layer 320. However, the waveguide 340 and the grating 350 are shown in the top views herein for ease of explanation.

Figure 4:
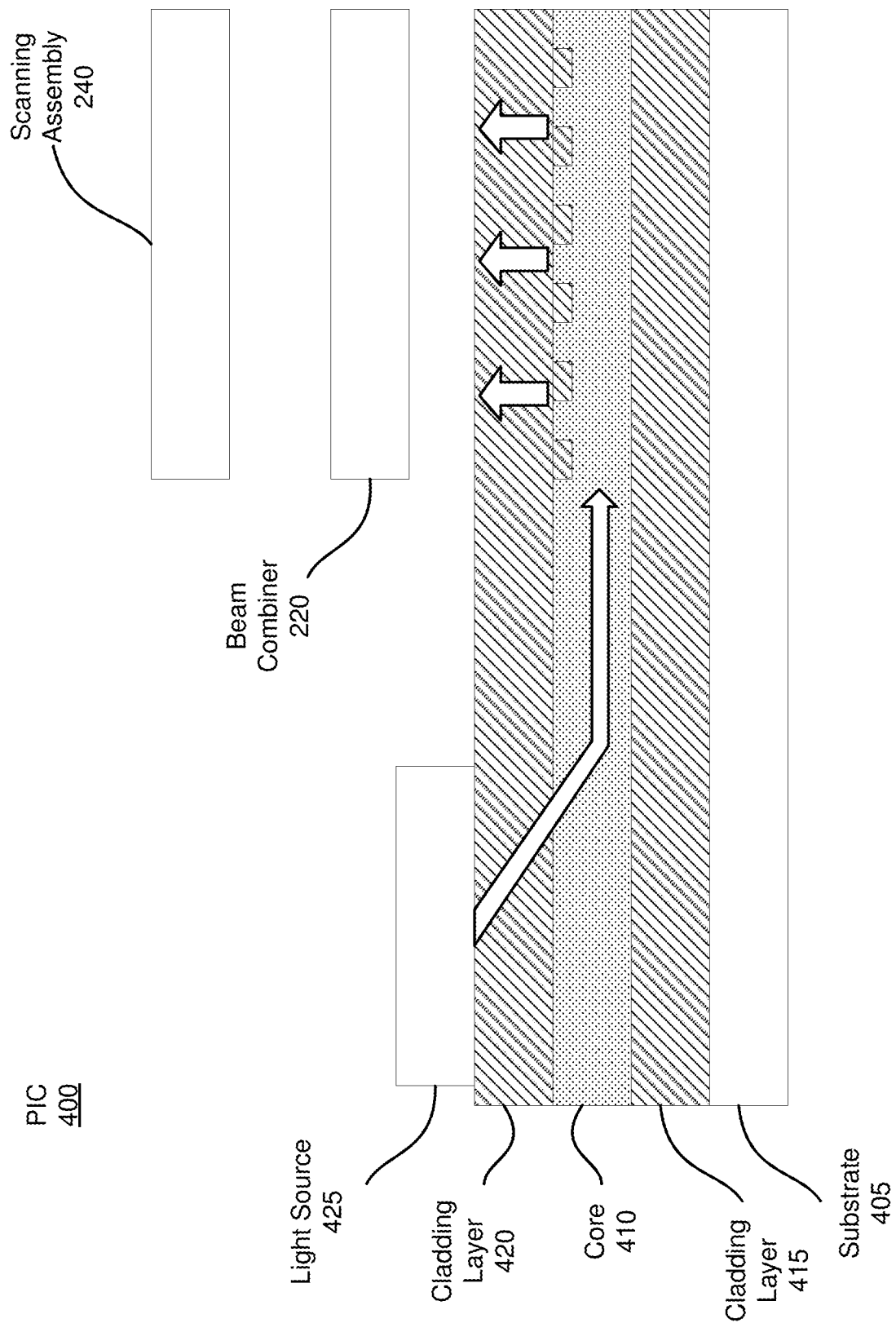
FIG. 4 illustrates a cross-section of a PIC for use in a scanning display system, in accordance with one or more embodiments.

FIG. 4 illustrates a cross-section of a PIC 400 for use in a scanning display system, in accordance with one or more embodiments. The PIC 400 is an embodiment of a PIC of the PIC assembly 210 of FIG. 2. The PIC 400 may comprise a substrate 405, a core 410, a first cladding layer 415, a second cladding layer 420, and a light source 425. The PIC 400 is configured to transmit light to the beam combiner 220. The beam combiner 220 combines multiple color channels of light into a combined beam and provides it to the scanning assembly 240. The substrate 405 is an embodiment of the substrate described with respect to the PIC assembly 210 of FIG. 2. The core 410 is an embodiment of the core described with respect to the PIC assembly 210 of FIG. 2. The cladding layer 415 and the cladding layer 420 are embodiments of the cladding layers described with respect to the PIC assembly 210 of FIG. 2. The light source 425 is an embodiment of the light source described with respect to the PIC assembly 210 of FIG. 2. The PIC 400 may comprise a single light source 425 or multiple light sources (e.g., that emit at different color channels). For example, the PIC 400 may include a red light source, a green light source, and a blue light source. The core 410 may comprise multiple color channels, each color channel having a respective light source and associated waveguide, as further described with respect to FIG. 5. In some embodiments, the core 410 may comprise a separate grating for each color channel, as further described with respect to FIG. 5. In some embodiments, the core 410 may comprise one multiple-wavelength grating which conditions light from multiple color channels, as further described with respect to FIGS. 8-10. In some embodiments, the core 410 may comprise one or more dual-layer gratings, as further described with respect to FIG. 12.

The beam combiner 220 is configured to combine conditioned light beams received from the gratings. The beam combiner 220 may comprise a refractive beam combiner, as further described with respect to FIG. 6. The beam combiner 220 may comprise a diffractive beam combiner, as further described with respect to FIG. 7. The scanning assembly 240 is configured to deflect the conditioned light beams received from the PIC 400 to create an image or pattern.

Figure 5:
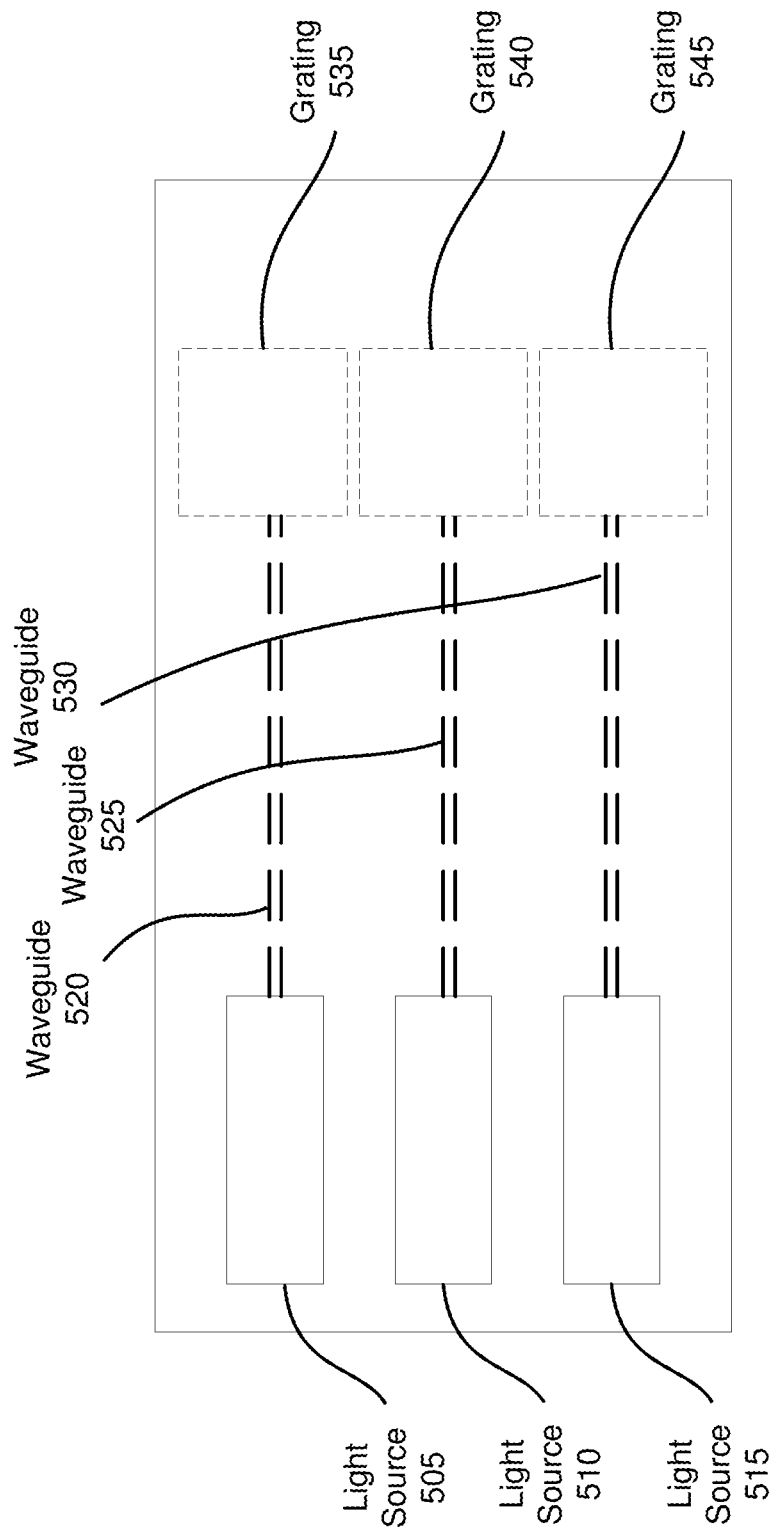
FIG. 5 illustrates a top view of a PIC having three single-wavelength gratings, in accordance with one or more embodiments.

FIG. 5 illustrates a top view of a PIC 500 having three single-wavelength gratings, in accordance with one or more embodiments. The PIC 500 is configured to emit three distinct light beams which may be collocated using a beam combiner. In some embodiments, the light beams may be collimated. The PIC 500 may be an embodiment the PIC 400 of FIG. 4 in which the PIC 400 has three color channels. The PIC 500 comprises a light source 505, a light source 510, a light source 515, a waveguide 520, a waveguide 525, a waveguide 530, a grating 535, a grating 540, and a grating 545. A first color channel may be associated with the source 505, the waveguide 520, and the grating 535. A second color channel may be associated with the light source 510, the waveguide 525, and the grating 540. A third color channel may be associated with the light source 515, the waveguide 530, and the grating 545.

The light source 505 is configured to emit light in a first wavelength, such as red light. The PIC 500 incouples the light to the waveguide 520. The waveguide 520 transmits the light to the grating 535. The grating 535 conditions the light. In some embodiments, the grating 535 collimates the light and directs the light out the top surface of the PIC 500.

The light source 510 is configured to emit light in a second wavelength, such as green light. The PIC 500 incouples the light to the waveguide 525. The waveguide 525 transmits the light to the grating 540. The grating 540 conditions the light. In some embodiments, the grating 540 collimates the light and directs the light out the top surface of the PIC 500.

The light source 515 is configured to emit light in a third wavelength, such as blue light. The PIC 500 incouples the light to the waveguide 530. The waveguide 530 transmits the light to the grating 545. The grating 545 conditions the light. In some embodiments, the grating 545 collimates the light and directs the light out the top surface of the PIC 500.

Each grating may be optimized to condition the light from its respective light source. A beam combiner (e.g., beam combiner 220) is configured to receive the conditioned light from the grating 535, the grating 540, and the grating 545, and combine the three beams of light into a single conditioned beam. In some embodiments the single conditioned beam may be collocated and collimated. However, in some embodiments, the grating 535, the grating 540, and the grating 545 may be located sufficiently close to each other such that the beams may be approximately collocated, and a separate beam combiner may be omitted. The conditioned beam may be transmitted to a scanning assembly (e.g. scanning assembly 240), and the scanning assembly may generate an image for display to a user.

Figure 6:
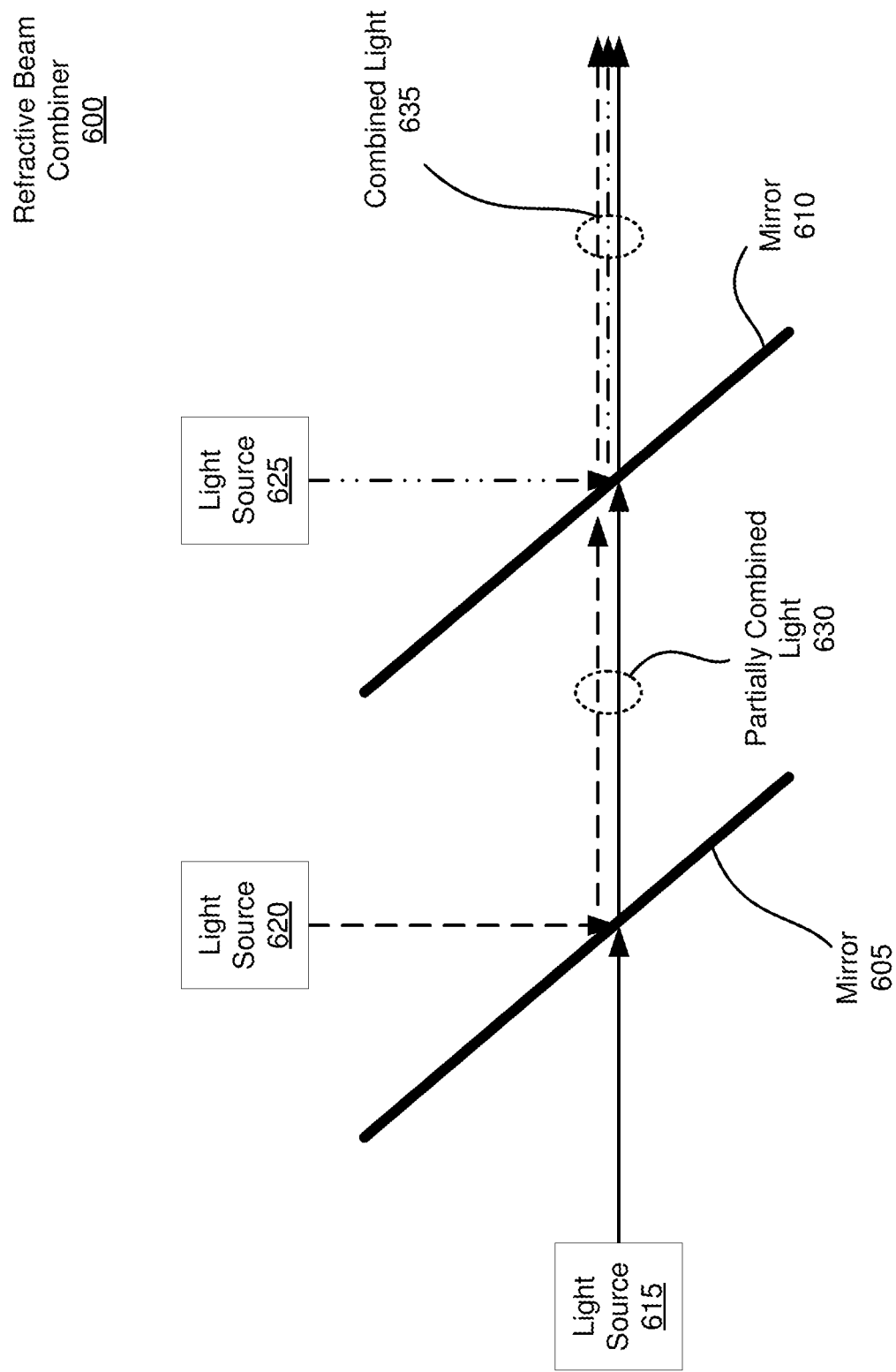
FIG. 6 illustrates a refractive beam combiner, in accordance with one or more embodiments.

FIG. 6 illustrates a refractive beam combiner 600, in accordance with one or more embodiments. The refractive beam combiner 600 is configured to combine discrete beams into a single collocated beam. Note that light sources 615, 620, 625, each correspond to gratings on a PIC that are diffracting different color channels (e.g., gratings 535, 540, 545). In some embodiments, the discrete beams may be collimated beams. The refractive beam combiner 600 may be an embodiment of the beam combiner 220 of FIG. 2. The beam combiner 600 includes a mirror 605 and a mirror 610. The mirrors 605 and 610 are dichroic mirrors. Each of the mirrors 605 and 610 have a respective transmission passband and respective reflection passband. A transmission passband is a band of wavelengths within which the mirrors 605 and 610 transmit an incident light. A reflection passband is a band of wavelengths within which the mirrors 605 and 610 reflect an incident light. The mirror 605 has a transmission passband that includes light emitted by the light source 615, and has a reflection passband that includes light emitted from the light source 620. In contrast, the mirror 610 has a transmission passband that includes light emitted by the light source 615 and the light source 620, and has a reflection passband that includes light emitted from the light source 625. Light from the light source 615 is transmitted by the mirror 605. Light from the light source 620 is reflected by the mirror 605 such that it creates a partially combined light 630. The partially combined light 630 is transmitted by the mirror 610. Light from the light source 625 is reflected by the mirror 610 such that it combines with the partially combined light 630 to form the combined light 635. While FIG. 6 illustrates an example including two mirrors and three different light sources, in other embodiments more and/or less mirrors and/or light from light sources may be combined in similar manner to form the combined light 635.

Figure 7:
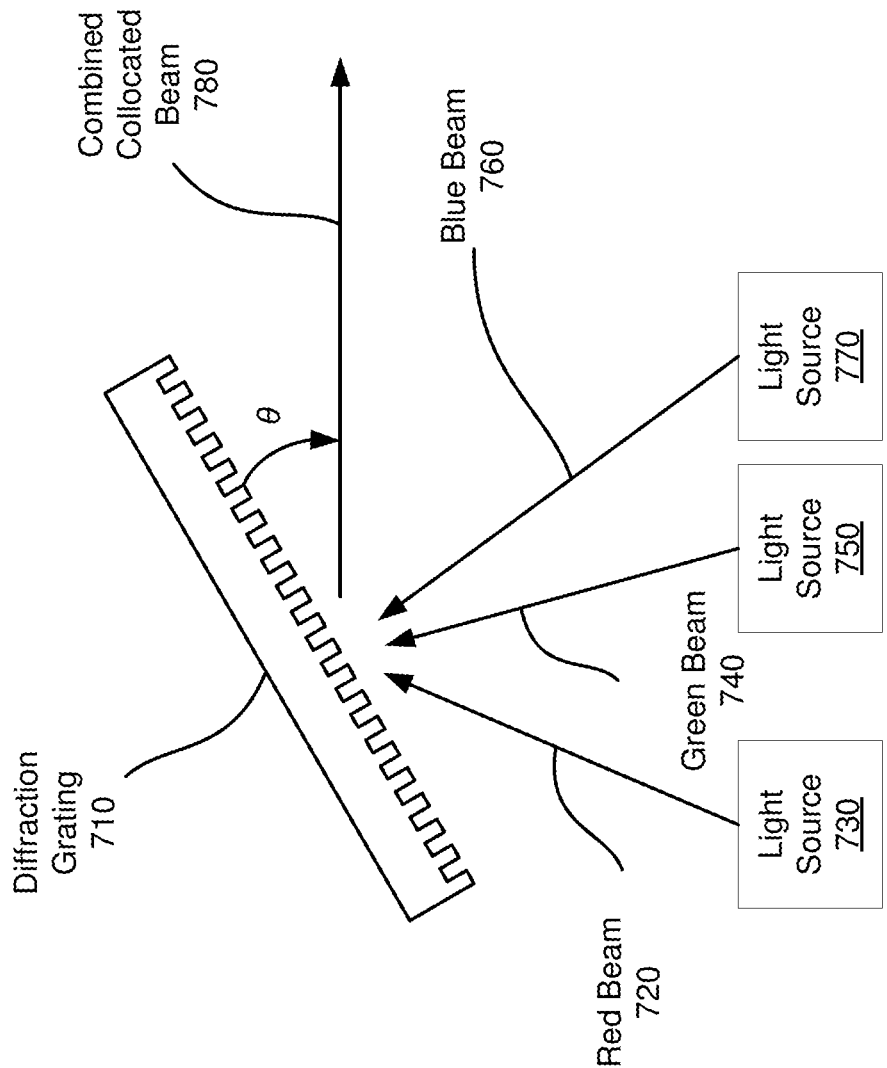
FIG. 7 illustrates a diffractive beam combiner, in accordance with one or more embodiments.

FIG. 7 illustrates a diffractive beam combiner 700, in accordance with one or more embodiments. The diffractive beam combiner 700 is configured to combine discrete beams into a single collocated beam. The diffractive beam combiner 700 may be an embodiment of the beam combiner 220 of FIG. 2. The diffractive beam combiner 700 comprises a diffraction grating 710. The diffraction grating 710 is configured to receive beams from multiple light sources of different wavelengths at different angles. For example, the diffraction grating 710 receives a red beam 720 from a light source 730, a green beam 740 from a light source 750, and a blue beam 760 from a light source 770. Note that the light sources 730, 750, 770, each correspond to gratings on a PIC that are diffracting different color channels (e.g., gratings 535, 540, 545). In some embodiments, one or more of the red beam 720, the green beam 740, and the blue beam 760 may be collimated. In general, longer wavelengths are diffracted by greater angles than shorter wavelengths. Thus, the red beam is diffracted by a greater angle than the green beam, which is diffracted by a greater angle than the blue beam. Each beam is angled relative to the diffraction grating 710 such that the beam leaves the diffraction grating 710 at the same angle θ relative to the diffraction grating, resulting in a combined collocated beam 780 of RGB light. In some embodiments, the combined collocated beam 780 may be collimated.

Figure 8:
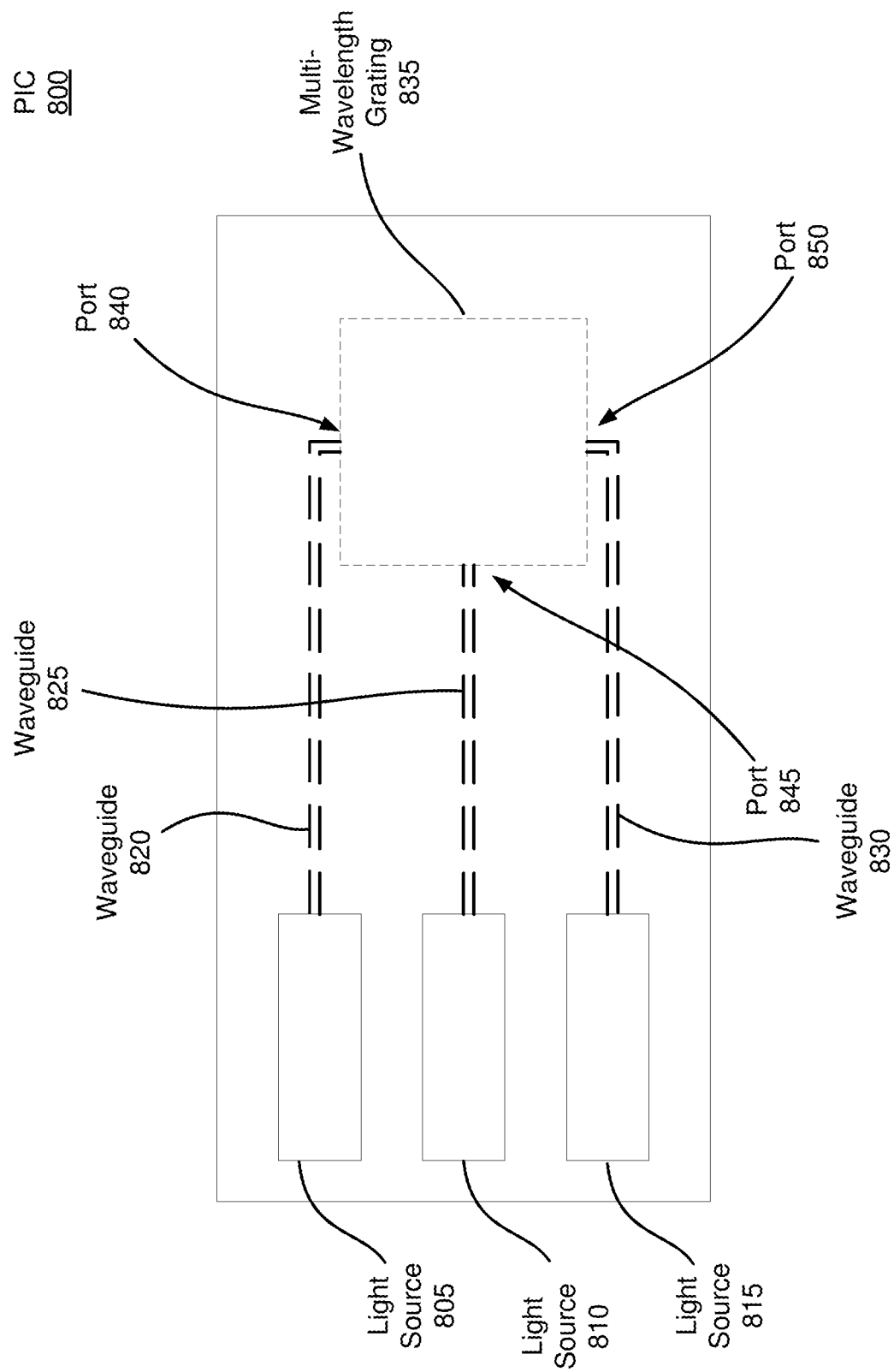
FIG. 8 illustrates a top view of a PIC having a triple-wavelength grating and three ports, in accordance with one or more embodiments.

FIG. 8 illustrates a top view of a PIC 800 having a triple-wavelength grating and three ports, in accordance with one or more embodiments. The PIC 800 is configured to emit conditioned light for use in a display system. In some embodiments, the conditioned light may be collocated and/or collimated. The PIC 800 may be an embodiment of the PIC 300 of FIG. 3A. The PIC 800 comprises a light source 805, a light source 810, a light source 815, a waveguide 820, a waveguide 825, a waveguide 830, and a multi-wavelength grating 835. The light source 805 is configured to emit light in a first wavelength, such as red light. The PIC 800 incouples the light to the waveguide 820. The waveguide 820 transmits the light to a port 840 of the multi-wavelength grating 835.

The light source 810 is configured to emit light in a second wavelength, such as green light. The PIC 800 incouples the light to the waveguide 825. The waveguide 825 transmits the light to a port 845 of the multi-wavelength grating 835. The light source 815 is configured to emit light in a third wavelength, such as blue light. The PIC 800 incouples the light to the waveguide 830. The waveguide 830 transmits the light to a port 850 of the multi-wavelength grating 835.

The multi-wavelength grating 835 is configured to condition the multiple wavelengths of light and transmit a conditioned (e.g., collocated and, in some embodiments collimated) beam out a top surface of the PIC 800. The conditioned beam may be transmitted to a scanning assembly (e.g., the scanning assembly 240), and the scanning assembly may generate an image for display to a user. In some embodiments, the scanning assembly may comprise a MEMS scanning mirror. The multi-wavelength grating 835 may comprise a tri-periodic structure, as further described with reference to FIG. 10.

Figure 9:
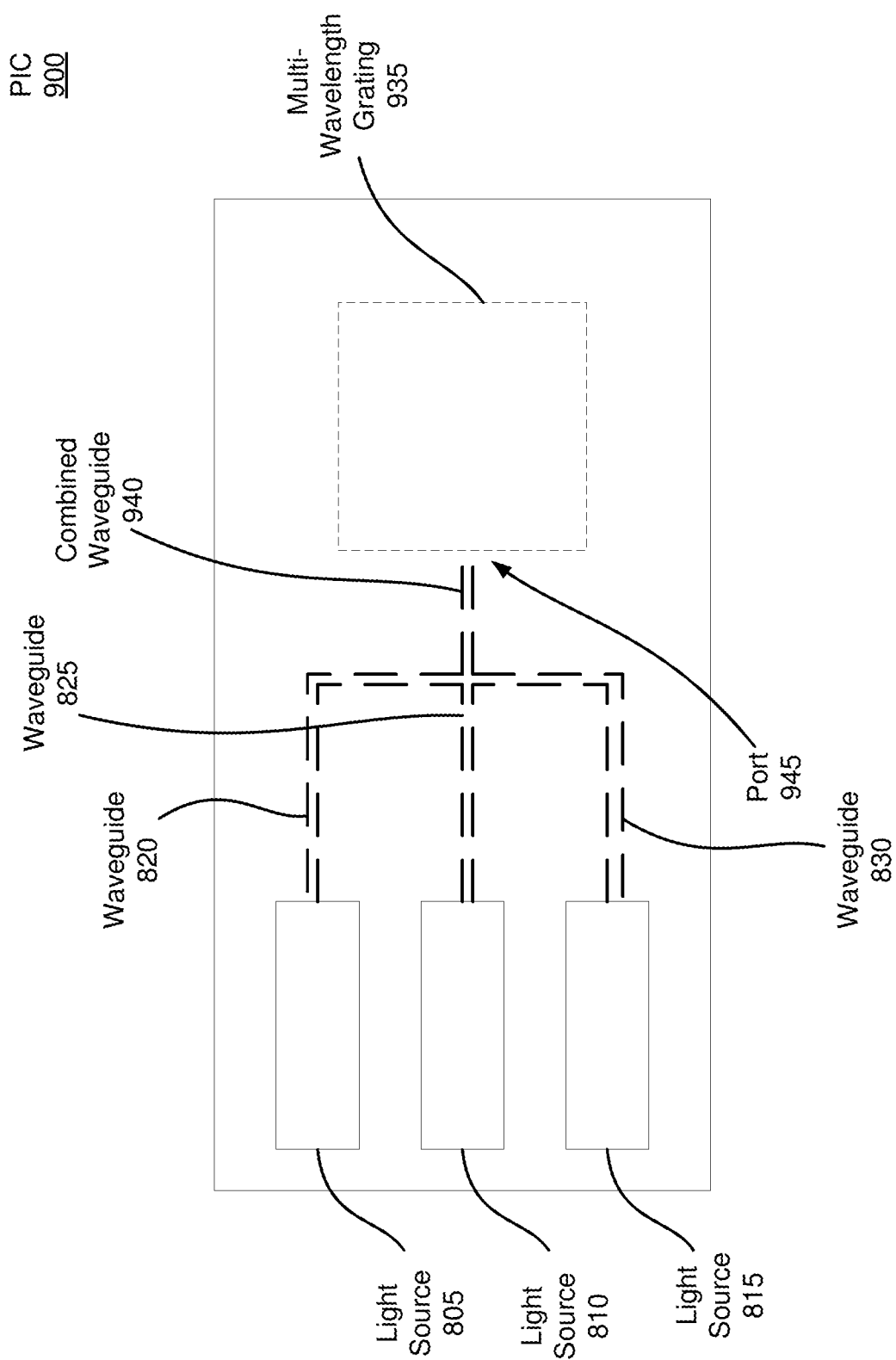
FIG. 9 illustrates a top view of a PIC having a triple-wavelength grating and one port, in accordance with one or more embodiments.

FIG. 9 illustrates a top view of a PIC 900 having a multi-wavelength grating and one port, in accordance with one or more embodiments. The PIC 900 is configured to emit conditioned light for use in a display system. In some embodiments, the conditioned light may be collocated and/or collimated. The PIC 900 may be an embodiment of the PIC 300 of FIG. 3A. The PIC 900 is substantially similar to the PIC 800, with the exception that the waveguide 820, the waveguide 825, and the waveguide 830 merge into a combined waveguide 940, and the combined waveguide 940 introduces light from the light sources 805, 810, 815 into the multi-wavelength grating 935 though a port 945.

Figure 10:
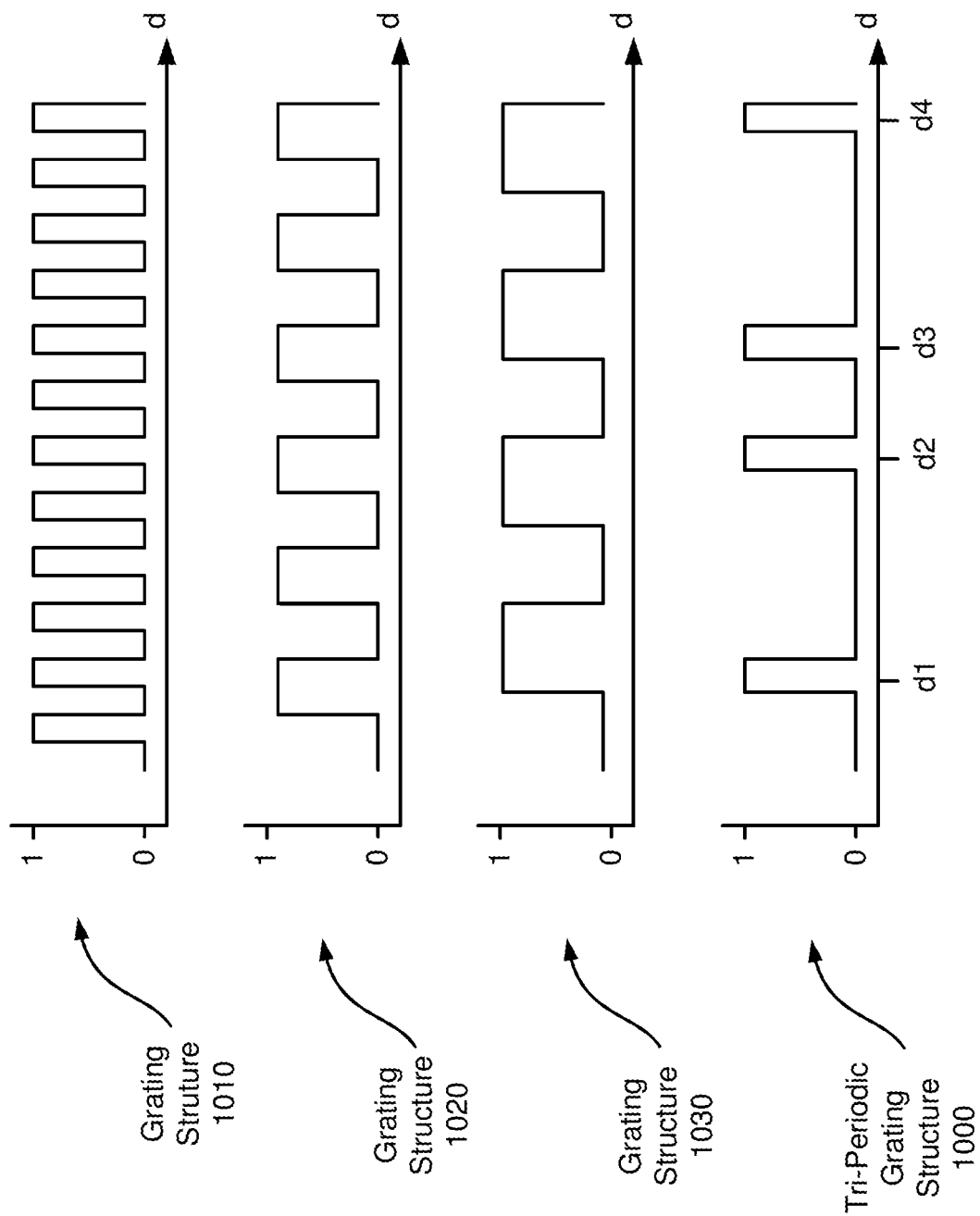
FIG. 10 illustrates a tri-periodic grating structure, in accordance with one or more embodiments.

FIG. 10 illustrates a tri-periodic grating structure 1000, in accordance with one or more embodiments. The tri-periodic grating structure 1000 is configured to diffract multiple wavelengths of light at the same angle using a single grating structure. The horizontal axis represents the distance across the grating structures, and the vertical axis represents the location of ridges or lines of the grating structure. A grating structure 1010 is optimized to diffract a first wavelength at a first angle. A grating structure 1020 is optimized to diffract a second wavelength at the same first angle. A grating structure 1030 is optimized to diffract a third wavelength at the same first angle. The tri-periodic grating structure 1000 contains ridges where all three grating structures 1010, 1020, 1030 contain ridges. As shown, at distances d1, d2, d3, and d4, all three grating structures 1010, 1020, and 1030 contain ridges, and thus at those points the tri-periodic grating structure 1000 contains ridges. In embodiments where different light wavelengths are incoupled to different sides of the tri-periodic grating structure 1000, such as in the embodiments shown in FIG. 8, the grating design may be unintuitive and may be optimized through inverse design approaches.

Although the tri-periodic grating structure 1000 may diffract a lower percentage of light than a single wavelength grating structure for a specific wavelength, the decrease in efficiency may be more than compensated by the decrease in packaging size and cost for PICs using a tri-periodic grating structure. Note that while the above is described in terms of three different wavelengths/periods, similar principles may be used to produce a two-period grating structure that diffracts two wavelengths (e.g., blue and green, red and green, etc.) of light at a same angle using a single grating structure.

Figure 11:
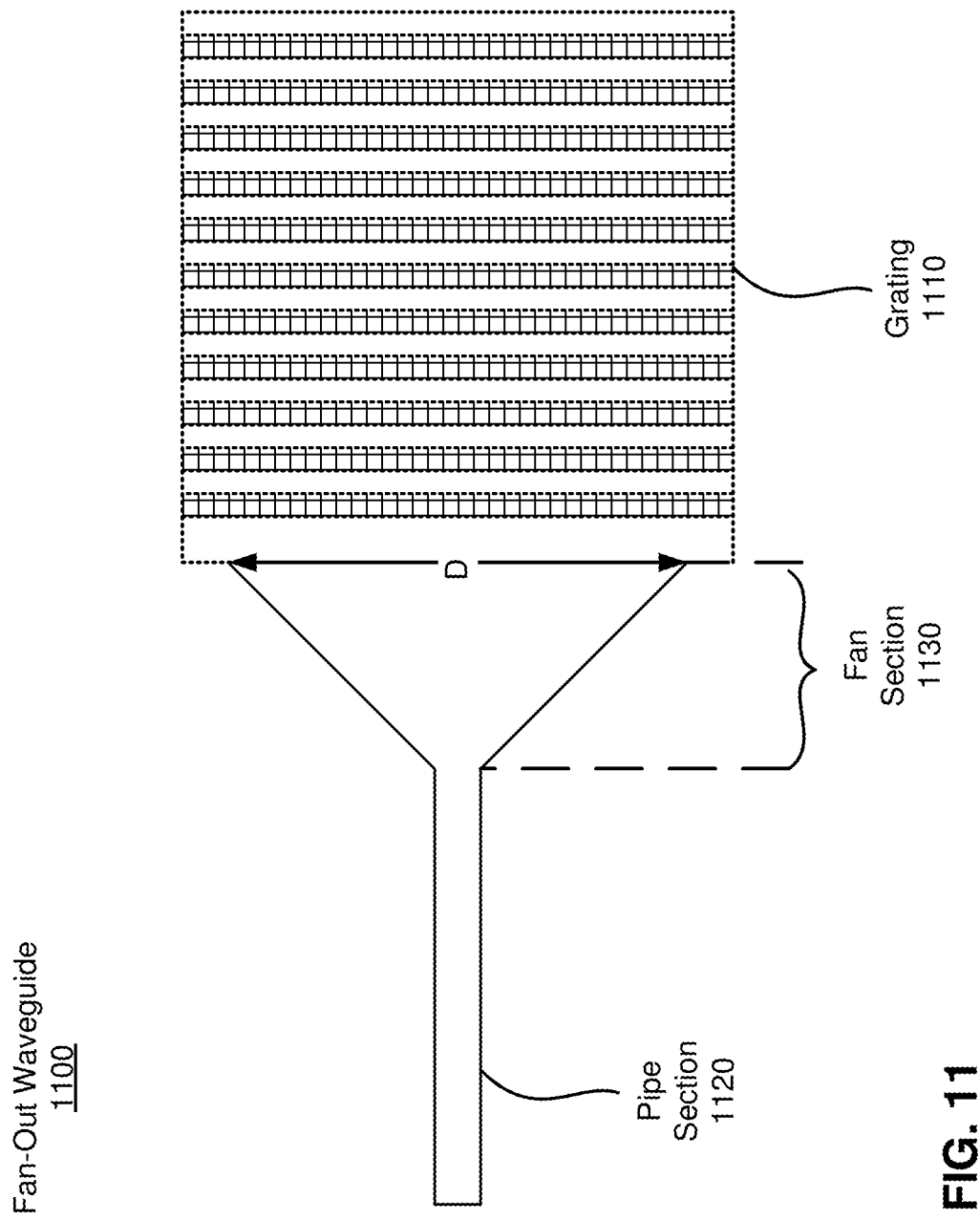
FIG. 11 illustrates a top view of a fan-out waveguide, in accordance with one or more embodiments.

FIG. 11 illustrates a top view of a fan-out waveguide 1100, in accordance with one or more embodiments. The fan-out waveguide 1100 is configured to incouple light to the grating 1110. The fan-out waveguide 1100 may be an embodiment of the waveguide 340 of FIG. 3A. The grating 1110 may be an embodiment of the grating 350 of FIG. 3A. The fan-out waveguide 1100 comprises a pipe section 1120 and a fan section 1130. The fan section 1130 is configured to distribute light in the pipe section 1120 across the entire grating 1110. The fan section 1130 is located between the pipe section 1120 and the grating 1110. A diameter D of the fan section 1130 is greater than the diameter of the pipe section 1120, and the diameter D increases at positions closer to the grating 1110. In some embodiments, the fan section 1130 may comprise a slab of optically transmissive material, such as glass or plastic. In some embodiments, the fan section 1130 may comprise a plurality of multi-mode interferometers (MMIs). Each MMI has two outputs. A first MMI may be coupled to two MMIs, and those two MMIs, may each be coupled to two additional MMIs, etc. The fan section 1130 is configured such that a phase of the light output into the grating 1110 across a diameter D of the fan section 1130 is constant.

Figure 12:
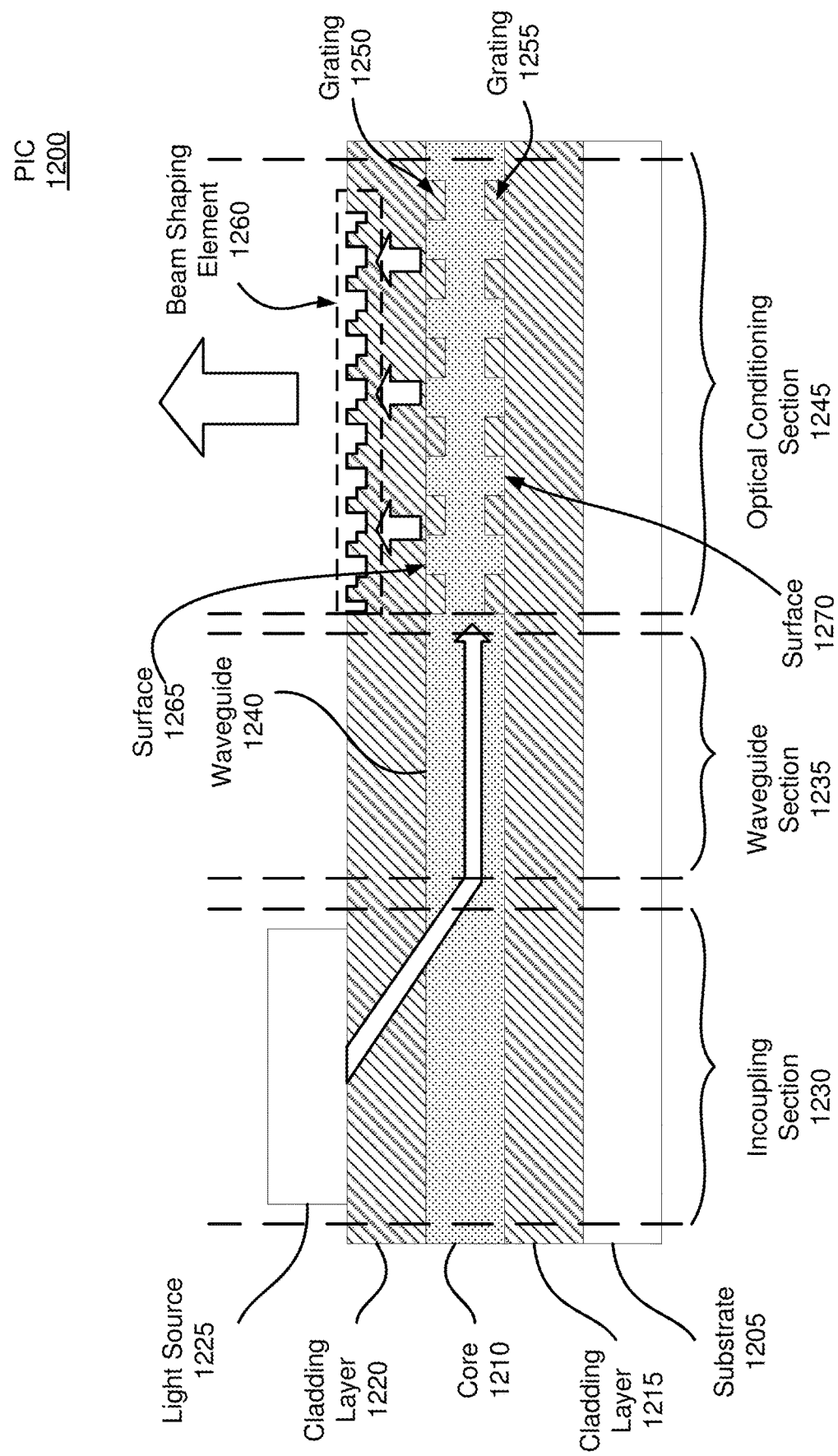
FIG. 12 illustrates a cross-section of a PIC configured as a structured light illuminator, in accordance with one or more embodiments.

FIG. 12 illustrates a cross-section of a PIC 1200 configured as a structured light illuminator, in accordance with one or more embodiments. The PIC 1200 is configured to generate conditioned light for use in a depth sensing system. The PIC 1200 may be an embodiment of the PIC assembly 210 of FIG. 2. The PIC 1200 may comprise a substrate 1205, a core 1210, a cladding layer 1215, a cladding layer 1220, and a light source 1225. The substrate 1205 is an embodiment of the substrate described with respect to the PIC assembly 210 of FIG. 2. The core 1210 is an embodiment of the core described with respect to the PIC assembly 210 of FIG. 2. The cladding layer 1215 and the cladding layer 1220 are embodiments of the cladding layers described with respect to the PIC assembly 210 of FIG. 2. The light source 1225 is an embodiment of the light source described with respect to the PIC assembly 210 of FIG. 2.

The core 1210 is configured to receive light from the light source 1225 and condition the light. The core 1210 may comprise a high-index material, such as SiN for NIR light sources. The core 1210 may comprise silicon for SWIR light sources.

The PIC 1200 comprises an incoupling section 1230 configured to incouple light from the light source 1225 into the core 1210. The PIC 1200 comprises a waveguide section 1235 containing a waveguide 1240 that is part of the core 1210. The waveguide 1240 is configured to transmit the incoupled light to an optical conditioning section 1245 of the core 1210. The optical conditioning section 1245 comprises one or more gratings configured to condition the light. Conditioning the light may include redirecting the light, collimating the light, shaping the beams, and/or aiming the beams.

In the optical conditioning section 1245, the core 1210 may comprise gratings on a surface 1265 of the core 1210 and/or a surface 1270 of the core 1210. The surface 1265 is opposite the surface 1270. The core 1210 may comprise a grating 1250 on the surface 1265 configured to condition the light. For example, the grating 1250 may be configured to collimate and redirect the light at an interface between the core 1210 and the cladding layer 1220. The core 1210 may comprise a grating 1255 on the surface 1270 configured to condition the light. For example, the grating 1255 may be configured to reflect light at an interface between the core 1210 and the cladding layer 1215.

The PIC 1200 may comprise a cladding layer 1215 and a cladding layer 1220 configured to provide protective material around the core 1210 and to provide additional surfaces on which to create optical conditioning elements. The cladding layer 1215 may be deposited directly on the substrate 1205 and be located between the substrate 1205 and the core 1210. The cladding layer 1220 may be deposited on the core 1210 and be exposed to the air on the top surface of the PIC 1200. The cladding layer 1215 and the cladding layer 1220 may comprise a low index material, such as $SiO_2$. The cladding layer 1220 may comprise a beam shaping element 1260 located at the air-cladding interface and configured to shape the beam of light exiting the PIC 1200 (e.g., shape the light into a structured light pattern, diverge the beam, or shape the beam in any other suitable manner). The beam shaping element 1260 may comprise a diffractive optical element or metasurface. In some embodiments, the beam shaping element 1250 may be etched into the cladding layer 1220.

The PIC 1200 comprises at least one light source 1225 configured to generate structured light for a depth sensing system. The light source 1225 may be an infrared light sources (e.g., a NIR light source, a SWIR light source, etc.). The light source 1225 may be deposited or grown on the top surface of the cladding layer 1230. In some embodiments, the light source 1225 may comprise VCSELs bonded to the cladding layer 1230. The VCSELs may be incoupled to the PIC 1200 through an incoupling structure in the incoupling section 1230 configured to incouple light from the light source to one or more wave guides. The incoupling structure may comprise a single-layer grating, a dual-layer grating, a grating with a back reflector (e.g., a distributed Bragg reflector, a metal reflector mirror, etc.) underneath the grating that is optimized for incoupling efficiency, a grating with apodization for period and duty cycle, a grating-like structure that is inversed designed for optimized incoupling for that light source, or some combination thereof.

FIG. 13 illustrates a cross-section of a PIC 1300 with multiple cores configured as a structured light illuminator, in accordance with one or more embodiments. The PIC 1300 is configured to generate conditioned light for use in a depth sensing system. The PIC 1300 may be an embodiment of the PIC assembly 210 of FIG. 2. The PIC 1300 is similar to the PIC 1200 of FIG. 12, with the exception of an additional core and cladding layer. The PIC 1300 comprises a core 1310 and a core 1320. The PIC 1300 comprises a cladding layer 1330, a cladding layer 1340, and a cladding layer 1350. At each core-cladding interface and at the cladding-air interface, an optical conditioning element may be formed. For example, the PIC 1300 may comprise a grating at a surface 1355 of the core 1310, at a surface 1360 of the core 1310, at a surface 1365 of the core 1320, at a surface 1370 of the core 1320, or some combination thereof. Light traveling through the core 1320 is diffracted by the gratings at the surface 1365 and the surface 1370. A portion of the light traveling through the core 1320 may be incoupled to the core 1310. The light traveling through the core 1310 is diffracted by the gratings at the surface 1355 and the surface 1360. Each corresponding grating may emit collimated light upwards. Additionally, the PIC 1300 may comprise a beam shaping element 1375 at the air-cladding interface of the cladding layer 1350. The beam shaping element 1375 may combine the collimated light emitted by the various gratings. Thus, by increasing the number of cores, the PIC 1300 provides additional degrees of freedom to condition the beam of light exiting the PIC 1300.

Figure 14:
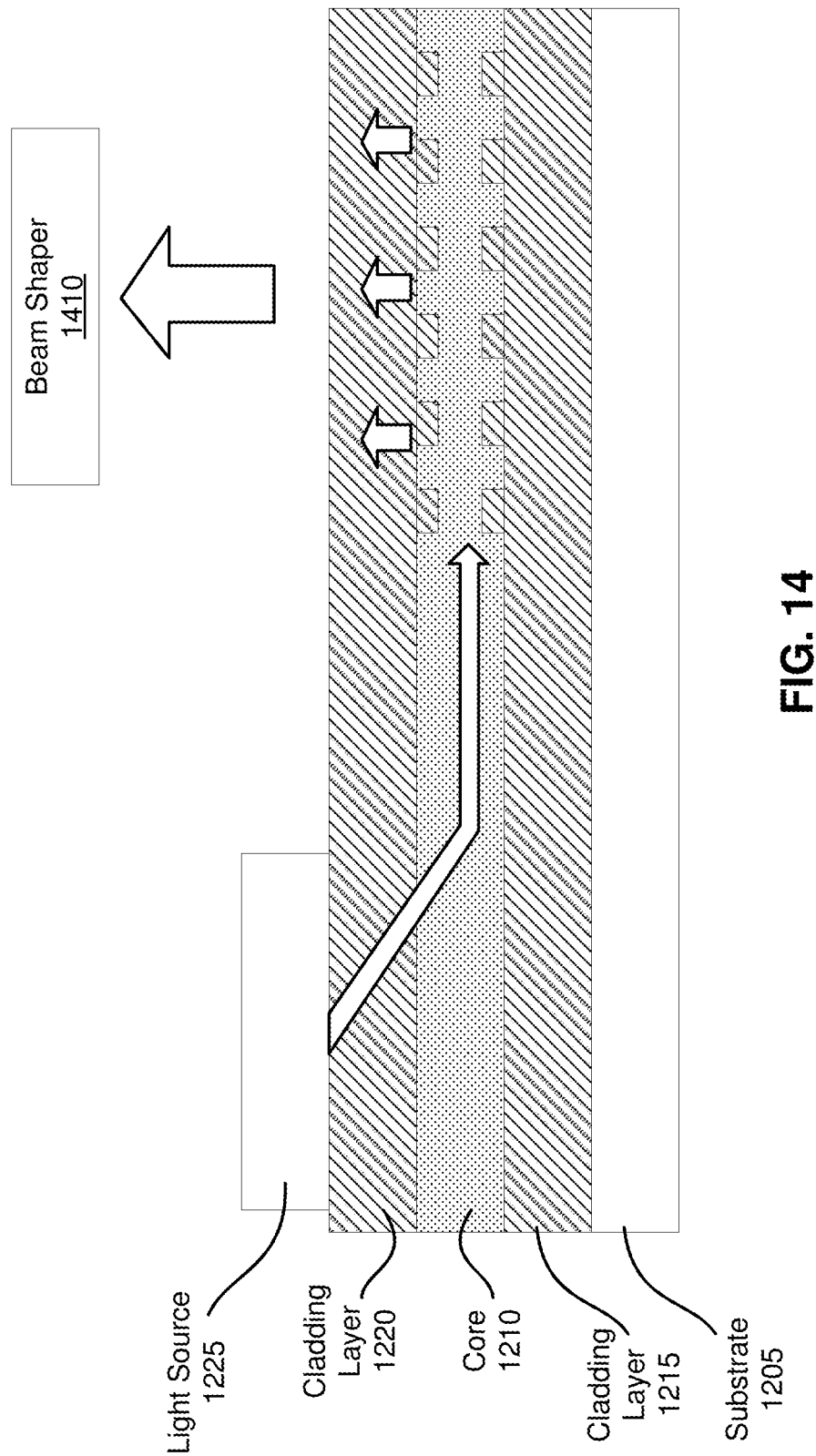
FIG. 14 illustrates a cross-section of a PIC configured as a structured light illuminator with an off-chip beam shaper, in accordance with one or more embodiments.

FIG. 14 illustrates a cross-section of a PIC 1400 configured as a structured light illuminator with an off-chip beam shaper 1410, in accordance with one or more embodiments. The PIC 1400 is configured to generate conditioned light for use in a depth sensing system. The PIC 1400 may be an embodiment of the PIC assembly 210 of FIG. 2. The beam shaper 1400 is an embodiment of the beam shaping element 230 of FIG. 2 The PIC 1400 may be similar to the PIC 1200 of FIG. 12, except instead of an integrated beam shaping element at the air-cladding interface, the PIC 1400 transmits conditioned light to an external beam shaping element 1410 to generate a structured light pattern. The beam shaping element 1410 may comprise a MEMS scanning mirror of MEMS phase modulator. In some embodiments, the beam shaping element 1410 may comprise liquid crystal flat optics. Even with the external beam shaping element 1410, the PIC 1400 may comprise a smaller form factor compared to systems with external collimation optics.

Figure 15:
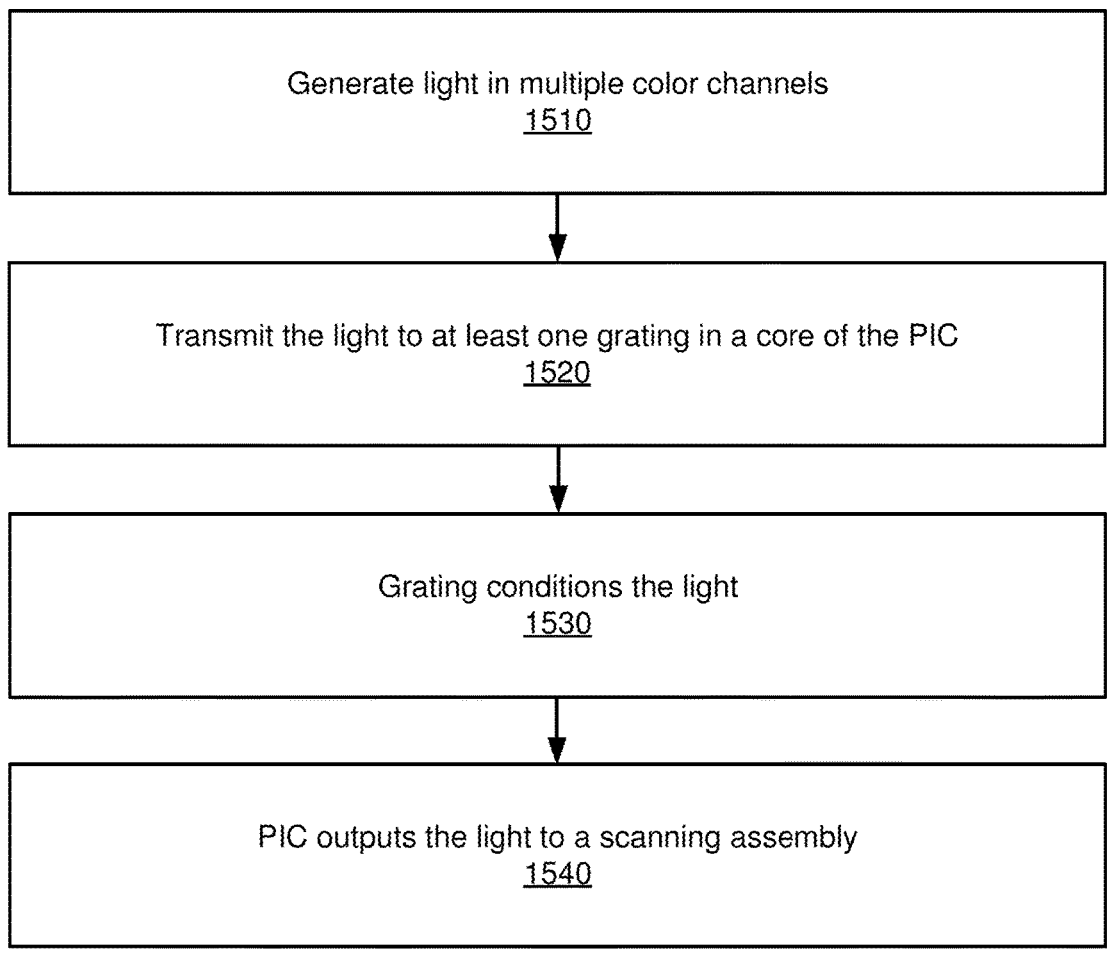
FIG. 15 illustrates a flowchart of a method for generating a display, in accordance with one or more embodiments.

FIG. 15 illustrates a flowchart of a method 1500 for generating a display, in accordance with one or more embodiments. The process shown in FIG. 15 may be performed by components of an optical system (e.g., optical system 200). Other entities may perform some or all of the steps in FIG. 15 in other embodiments. Embodiments may include different and/or additional steps, or perform the steps in different orders.

A plurality of light sources in a PIC (e.g., a PIC in the PIC assembly 210 of FIG. 2) generate 1510 light in multiple color channels. For example, the PIC may generate light in a first color channel (e.g., red), a second color channel (green), and a third color channel (blue). In some embodiments, there are only two color channels, and other embodiments, there may be more than three color channels.

A waveguide for each light source in the PIC transmits 1520 the light to a grating in a core of the PIC. In some embodiments, the light from each light source may be transmitted to a separate grating. In some embodiments, the light from multiple light sources may be transmitted to a multiple-wavelength grating. One or more of the waveguides may comprise a fan section configured to incouple the light to the at least one grating.

The grating conditions 1530 the light. Conditioning the light may comprise redirecting the light from a first direction to a second direction, collimating the light, combining light beams, or some combination thereof. The grating may comprise three separate gratings, where each grating is optimized for a different wavelength. The grating may comprise a triple-wavelength grating configured to condition three different wavelengths.

The PIC outputs 1540 the conditioned light to a scanning assembly. The PIC may outcouple the light at an air-cladding interface. The scanning assembly generates an image for display to a user based on instructions from a controller.

Figure 16:
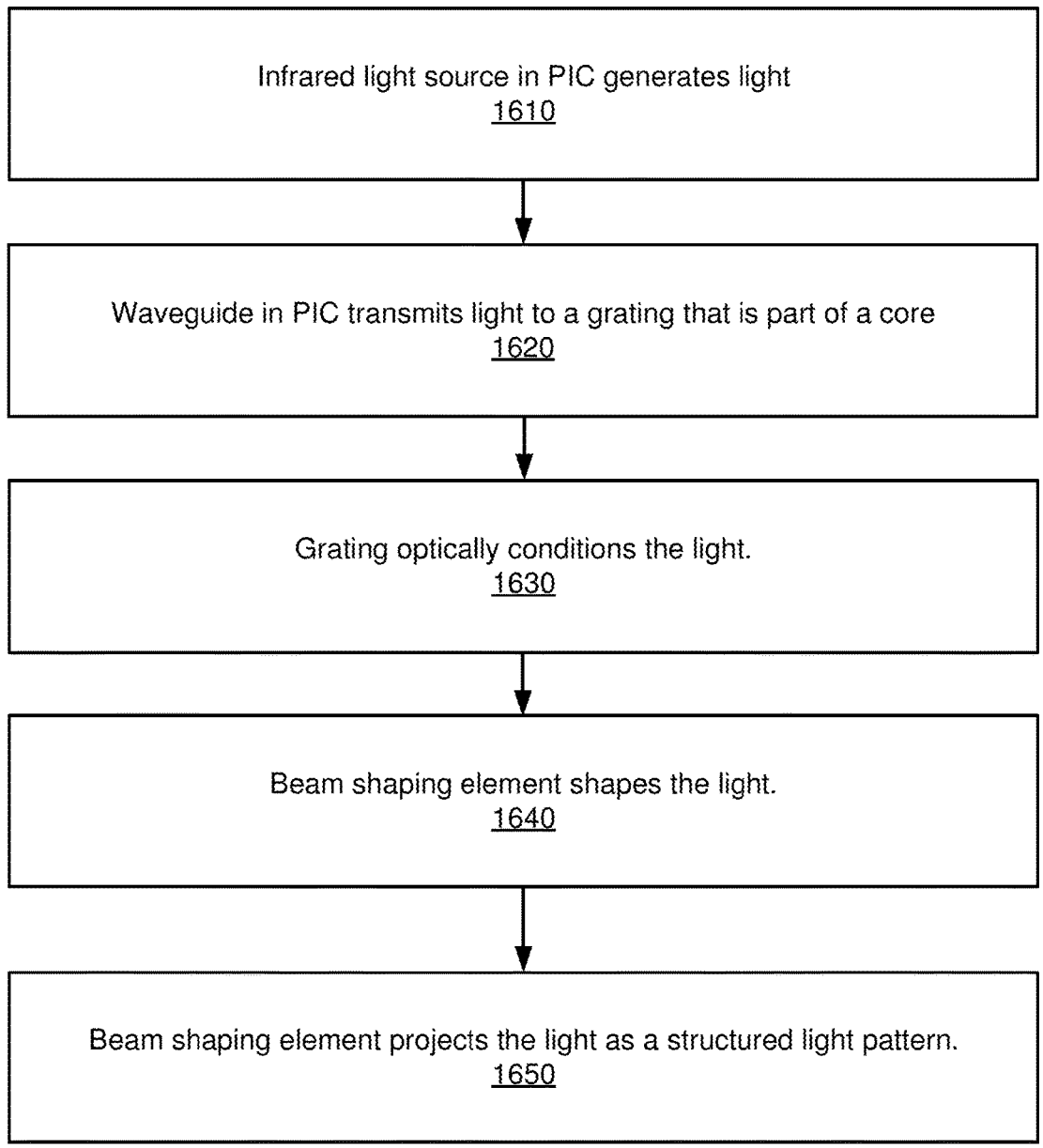
FIG. 16 illustrates a flowchart of a method for generating a structured light pattern, in accordance with one or more embodiments.

FIG. 16 illustrates a flowchart of a method 1600 for generating a structured light pattern, in accordance with one or more embodiments. The process shown in FIG. 16 may be performed by components of an optical system (e.g., optical system 200). Other entities may perform some or all of the steps in FIG. 16 in other embodiments. Embodiments may include different and/or additional steps, or perform the steps in different orders.

An infrared light source in a PIC generates 1610 light. The light may comprise NIR light or SWIR light. The light is incoupled into a core within an incoupling section of the PIC. In some embodiments, the light is incoupled into multiple cores.

A waveguide in the PIC transmits 1620 light to a grating that is part of the core of the PIC. The waveguide is part of a waveguide section of the PIC that directs incoupled light in a first direction (e.g., parallel to a surface of the substrate). In embodiments with multiple cores, the PIC includes a waveguide section that includes a waveguide for each core. The PIC also includes an optical conditioning section that includes one or more gratings. A core may have gratings on a top and/or bottom surface. Each waveguide transmits light to one or more respective gratings that are part of the respective core. One or more of the waveguides may provide light to a fan section that is configured to incouple the light to the one or more gratings.

The grating conditions 1630 the light. Conditioning the light may comprise redirecting the light from a first direction to second direction, reflecting the light, collimating the light, or some combination thereof. The one or more gratings are configured to condition the light from the one or more waveguides and output the conditioned light in a second direction (e.g., perpendicular to a surface of the substrate) different than the first direction. For example, the conditioned infrared light may be collimated and redirected such that it propagates in a direction perpendicular to the surface of the substrate.

A beam shaping element shapes 1640 the light. The beam shaping element may be located at an air-cladding interface. The beam shaping element may comprise a diffractive optical element or metasurface. The beam shaping element may comprise a reflective beam shaping element located external to the PIC. The beam shaping element may comprise liquid crystal flat optics. The beam shaping element generates a structured light pattern.

The beam shaping element projects 1650 the shaped light as a structured light pattern. The structured light pattern may be utilized in a depth sensing system.

Figure 17:
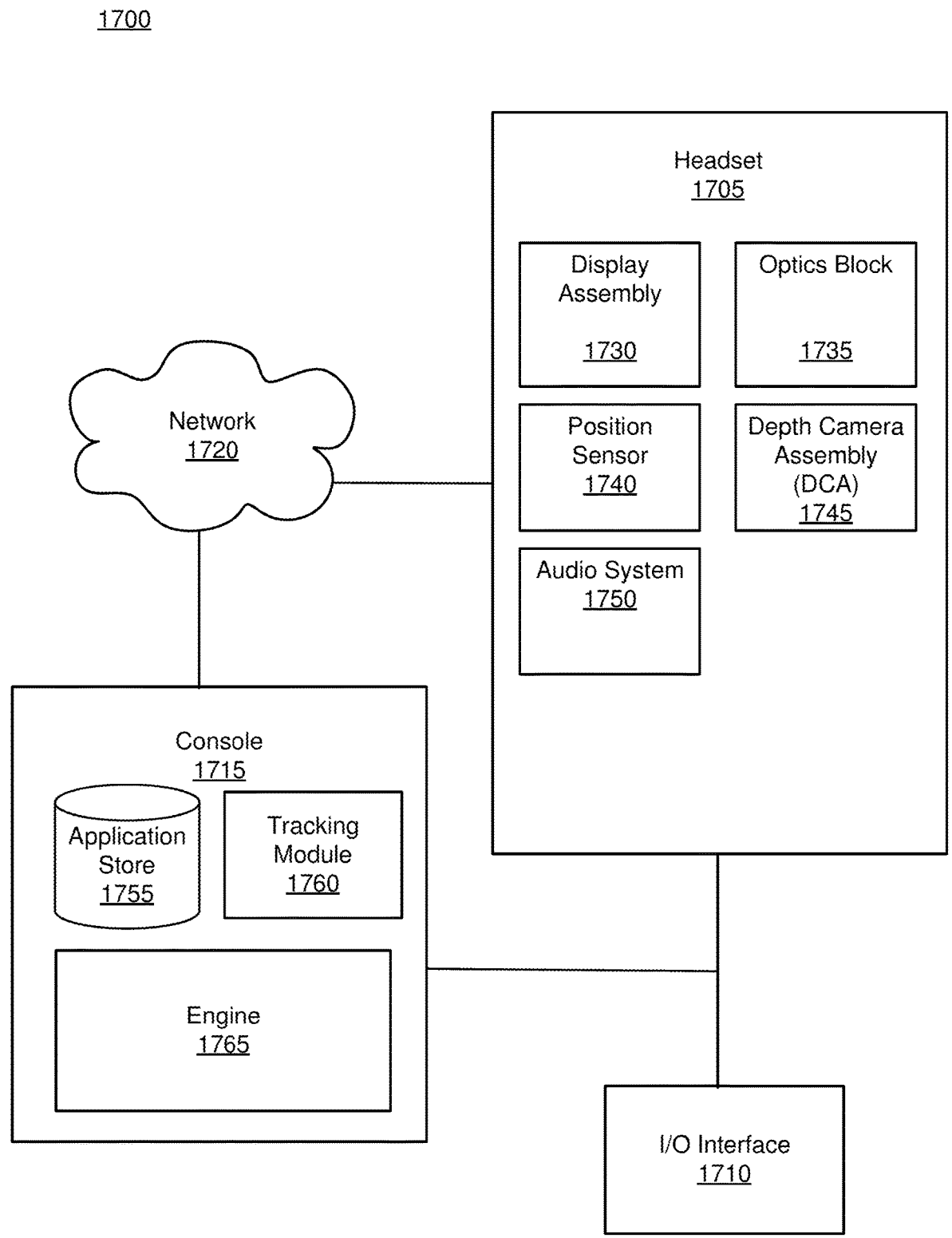
FIG. 17 is a system that includes a headset, in accordance with one or more embodiments.

FIG. 17 is a system 1700 that includes a headset 1705, in accordance with one or more embodiments. In some embodiments, the headset 1705 may be the headset 100 of FIG. 1A or the headset 105 of FIG. 1B. The system 1700 may operate in an artificial reality environment (e.g., a virtual reality environment, an augmented reality environment, a mixed reality environment, or some combination thereof). The system 1700 shown by FIG. 17 includes the headset 1705, an input/output (I/O) interface 1710 that is coupled to a console 1715, and the network 1720. While FIG. 17 shows an example system 1700 including one headset 1705 and one I/O interface 1710, in other embodiments any number of these components may be included in the system 1700. For example, there may be multiple headsets each having an associated I/O interface 1710, with each headset and I/O interface 1710 communicating with the console 1715. In alternative configurations, different and/or additional components may be included in the system 1700. Additionally, functionality described in conjunction with one or more of the components shown in FIG. 17 may be distributed among the components in a different manner than described in conjunction with FIG. 17 in some embodiments. For example, some or all of the functionality of the console 1715 may be provided by the headset 1705.

The headset 1705 includes the display assembly 1730, an optics block 1735, one or more position sensors 1740, and the DCA 1745. Some embodiments of headset 1705 have different components than those described in conjunction with FIG. 17. Additionally, the functionality provided by various components described in conjunction with FIG. 17 may be differently distributed among the components of the headset 1705 in other embodiments, or be captured in separate assemblies remote from the headset 1705.

The display assembly 1730 displays content to the user in accordance with data received from the console 1715. The display assembly 1730 displays the content using one or more display elements (e.g., the display elements 120). The display assembly 1730 may comprise one or more PICs that generate conditioned light for the display elements. For example, the conditioned light may comprise collimated and/or collocated beams. A display element may be, e.g., an electronic display. In various embodiments, the display assembly 1730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 1735.

The optics block 1735 may magnify image light received from the electronic display, corrects optical errors associated with the image light, and presents the corrected image light to one or both eyeboxes of the headset 1705. In various embodiments, the optics block 1735 includes one or more optical elements. Example optical elements included in the optics block 1735 include: an aperture, a Fresnel lens, a convex lens, a concave lens, a filter, a reflecting surface, or any other suitable optical element that affects image light. Moreover, the optics block 1735 may include combinations of different optical elements. In some embodiments, one or more of the optical elements in the optics block 1735 may have one or more coatings, such as partially reflective or anti-reflective coatings.

Magnification and focusing of the image light by the optics block 1735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1735 corrects the distortion when it receives image light from the electronic display generated based on the content.

The position sensor 1740 is an electronic device that generates data indicating a position of the headset 1705. The position sensor 1740 generates one or more measurement signals in response to motion of the headset 1705. The position sensor 190 is an embodiment of the position sensor 1740. Examples of a position sensor 1740 include: one or more IMUs, one or more accelerometers, one or more gyroscopes, one or more magnetometers, another suitable type of sensor that detects motion, or some combination thereof. The position sensor 1740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1705 from the sampled data. For example, the IMU integrates the measurement signals received from the accelerometers over time to estimate a velocity vector and integrates the velocity vector over time to determine an estimated position of a reference point on the headset 1705. The reference point is a point that may be used to describe the position of the headset 1705. While the reference point may generally be defined as a point in space, however, in practice the reference point is defined as a point within the headset 1705.

The DCA 1745 generates depth information for a portion of the local area. The DCA includes one or more imaging devices and a DCA controller. The DCA 1745 may also include an illuminator. The DCA 1745 may comprise one or more PICs that generate conditioned light for the illuminator. For example, the conditioned light may comprise collimated and/or shaped beams. Operation and structure of the DCA 1745 is described above with regard to FIG. 1A.

The audio system 1750 provides audio content to a user of the headset 1705. The audio system 1750 may comprise one or acoustic sensors, one or more transducers, and an audio controller. The audio system 1750 may provide spatialized audio content to the user. The audio system 1750 may provide information describing at least a portion of the local area from e.g., the DCA 1745 and/or location information for the headset 1705 from the position sensor 1740. The audio system 1750 may generate one or more sound and use the sound filters to provide audio content to the user.

The I/O interface 1710 is a device that allows a user to send action requests and receive responses from the console 1715. An action request is a request to perform a particular action. For example, an action request may be an instruction to start or end capture of image or video data, or an instruction to perform a particular action within an application. The I/O interface 1710 may include one or more input devices. Example input devices include: a keyboard, a mouse, a game controller, or any other suitable device for receiving action requests and communicating the action requests to the console 1715. An action request received by the I/O interface 1710 is communicated to the console 1715, which performs an action corresponding to the action request. In some embodiments, the I/O interface 1710 includes an IMU that captures calibration data indicating an estimated position of the I/O interface 1710 relative to an initial position of the I/O interface 1710. In some embodiments, the I/O interface 1710 may provide haptic feedback to the user in accordance with instructions received from the console 1715. For example, haptic feedback is provided when an action request is received, or the console 1715 communicates instructions to the I/O interface 1710 causing the I/O interface 1710 to generate haptic feedback when the console 1715 performs an action.

The console 1715 provides content to the headset 1705 for processing in accordance with information received from one or more of: the DCA 1745, the headset 1705, and the I/O interface 1710. In the example shown in FIG. 17, the console 1715 includes an application store 1755, a tracking module 1760, and an engine 1765. Some embodiments of the console 1715 have different modules or components than those described in conjunction with FIG. 17. Similarly, the functions further described below may be distributed among components of the console 1715 in a different manner than described in conjunction with FIG. 17. In some embodiments, the functionality discussed herein with respect to the console 1715 may be implemented in the headset 1705, or a remote system.

The application store 1755 stores one or more applications for execution by the console 1715. An application is a group of instructions, that when executed by a processor, generates content for presentation to the user. Content generated by an application may be in response to inputs received from the user via movement of the headset 1705 or the I/O interface 1710. Examples of applications include: gaming applications, conferencing applications, video playback applications, or other suitable applications.

The tracking module 1760 tracks movements of the headset 1705 or of the I/O interface 1710 using information from the DCA 1745, the one or more position sensors 1740, or some combination thereof. For example, the tracking module 1760 determines a position of a reference point of the headset 1705 in a mapping of a local area based on information from the headset 1705. The tracking module 1760 may also determine positions of an object or virtual object. Additionally, in some embodiments, the tracking module 1760 may use portions of data indicating a position of the headset 1705 from the position sensor 1740 as well as representations of the local area from the DCA 1745 to predict a future location of the headset 1705. The tracking module 1760 provides the estimated or predicted future position of the headset 1705 or the I/O interface 1710 to the engine 1765.

The engine 1765 executes applications and receives position information, acceleration information, velocity information, predicted future positions, or some combination thereof, of the headset 1705 from the tracking module 1760. Based on the received information, the engine 1765 determines content to provide to the headset 1705 for presentation to the user. For example, if the received information indicates that the user has looked to the left, the engine 1765 generates content for the headset 1705 that mirrors the user's movement in a virtual local area or in a local area augmenting the local area with additional content. Additionally, the engine 1765 performs an action within an application executing on the console 1715 in response to an action request received from the I/O interface 1710 and provides feedback to the user that the action was performed. The provided feedback may be visual or audible feedback via the headset 1705 or haptic feedback via the I/O interface 1710.

The network 1720 couples the headset 1705 and/or the console 1715 to external servers and computer systems. The network 1720 may include any combination of local area and/or wide area networks using both wireless and/or wired communication systems. For example, the network 1720 may include the Internet, as well as mobile telephone networks. In one embodiment, the network 1720 uses standard communications technologies and/or protocols. Hence, the network 1720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 1700 may contain a privacy module that stores one or more privacy settings for user data elements. The user data elements describe the user or the headset 1705. For example, the user data elements may describe a physical characteristic of the user, an action performed by the user, a location of the user of the headset 1705, a location of the headset 1705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1700 may include one or more authorization/ privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A photonic integrated circuit assembly comprising:
   a substrate;
   a first light source coupled to the substrate, the first light source configured to emit light;
   a first incoupling section configured to incouple the light from the first light source into a core that is coupled to the substrate;
   a waveguide section configured to direct the incoupled light within the core along a first direction;
   an optical conditioning section that includes one or more gratings that are part of the core and are configured to condition the incoupled light and output the conditioned light in a second direction different than the first direction;
   a cladding layer coupled to the core, wherein a grating of the one or more gratings is located at an interface between the cladding layer and the core; and
   a conditioning element located at an air-cladding interface, wherein the conditioning element is configured to shape the conditioned light output from the photonic integrated circuit assembly.

2. The photonic integrated circuit assembly of claim 1, wherein the one or more gratings in the optical conditioning section are configured to collimate the incoupled light.

3. The photonic integrated circuit assembly of claim 1, further comprising:
- a second light source configured to emit light in a different color channel than the first light source;
- a second incoupling section configured to incouple the light from the second light source into a second core that is coupled to the substrate;
- a second waveguide section configured to direct the incoupled light within the second core along a third direction; and
- a second optical conditioning section that includes one or more gratings that are part of the second core and are configured to condition the incoupled light and output the conditioned light in a fourth direction different than the second direction.

4. The photonic integrated circuit assembly of claim 1, wherein the one or more gratings comprise a multi-wavelength grating.

5. The photonic integrated circuit assembly of claim 1, wherein the shaped light comprises a structured light pattern.

6. A photonic integrated circuit assembly comprising:
- a substrate;
- an infrared light source coupled to the substrate, wherein the infrared light source is configured to emit infrared light;
- an incoupling section coupled to the substrate, wherein the incoupling section is configured to incouple the light from the infrared light source into a core;
- a waveguide section that includes a waveguide, wherein the waveguide is configured to direct the incoupled light within the core along a first direction;
- an optical conditioning section that includes one or more gratings that are part of the core and are configured to condition the incoupled light from the waveguide and output the conditioned light in a second direction different than the first direction;
- a first cladding layer coupled to a first side of the of the core, wherein the first cladding layer is located between the core and the substrate; and
- a second cladding layer coupled to a second side of the core,
- wherein a first grating of the one or more gratings in the optical conditioning section is located at an interface between the core and the first cladding, and wherein a second grating of the one or more gratings in the optical conditioning section is located at an interface between the core and the second cladding layer.

7. The photonic integrated circuit assembly of claim 6, wherein the first grating is a reflective grating.

8. The photonic integrated circuit assembly of claim 6, further comprising a beam shaping element located at an air-cladding interface between the second cladding layer and the air, wherein the beam shaping element is configured to generate a structured light pattern for a depth sensing system, wherein the beam shaping element comprises at least one of a diffraction grating or a metasurface that comprises dielectric nanostructures or metallic nanostructures.

9. The photonic integrated circuit assembly of claim 6, wherein
- the incoupling section further includes a second core, the second core having a top surface that is coupled to a bottom surface of the second cladding layer, the incoupling section configured to incouple at least some of the light from the infrared light source into the second core;
- the waveguide section includes a second waveguide that is part of the second core, the second waveguide configured to direct the incoupled light within the second core along the first direction; and
- the optical conditioning section includes one or more gratings that are part of the second core and are configured to condition the light from the second waveguide and output the conditioned light in the second direction.

\* \* \* \* \*